United States Patent
Jeon

(10) Patent No.: US 12,105,911 B2
(45) Date of Patent: Oct. 1, 2024

(54) TOUCH DISPLAY DEVICE AND TOUCH DRIVING METHOD

(71) Applicant: LG Display Co., Ltd., Seoul (KR)

(72) Inventor: Jeseong Jeon, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/213,012

(22) Filed: Jun. 22, 2023

(65) Prior Publication Data
US 2024/0036675 A1    Feb. 1, 2024

(30) Foreign Application Priority Data

Jul. 26, 2022  (KR) .......................... 10-2022-0092300

(51) Int. Cl.
  *G06F 3/041*  (2006.01)
  *G06F 3/044*  (2006.01)
  *G09G 3/36*   (2006.01)

(52) U.S. Cl.
  CPC ........ *G06F 3/04166* (2019.05); *G06F 3/0412* (2013.01); *G06F 3/0446* (2019.05); *G09G 3/3677* (2013.01); *G09G 2300/0426* (2013.01); *G09G 2300/0842* (2013.01); *G09G 2300/0861* (2013.01); *G09G 2320/0204* (2013.01); *G09G 2320/041* (2013.01)

(58) Field of Classification Search
  CPC .. G06F 3/04166; G06F 3/0412; G06F 3/0446; G09G 3/3677; G09G 2300/0426; G09G 2300/0842; G09G 2300/0861; G09G 2320/0204; G09G 2320/041
  See application file for complete search history.

(56) References Cited

U.S. PATENT DOCUMENTS

| | | | |
|---|---|---|---|
| 2007/0221664 A1* | 9/2007 | Ito ........................ | H05B 6/062 307/130 |
| 2010/0079441 A1* | 4/2010 | Sasaki .................. | G09G 3/3655 345/213 |
| 2012/0032911 A1* | 2/2012 | Jung ...................... | G06F 3/042 345/174 |
| 2017/0168620 A1* | 6/2017 | Gim ..................... | G06F 3/04184 |
| 2018/0366081 A1* | 12/2018 | Jangda ................. | G09G 3/3655 |
| 2020/0210025 A1* | 7/2020 | Kim ...................... | G06F 3/0448 |
| 2021/0064175 A1* | 3/2021 | Fu ........................ | G06F 3/04166 |

* cited by examiner

*Primary Examiner* — Sahlu Okebato
(74) *Attorney, Agent, or Firm* — Birch, Stewart, Kolasch & Birch, LLP

(57) ABSTRACT

A touch display device can include a display panel including a plurality of touch electrodes; a gate driving circuit to apply a plurality of scan signals to the display panel through a plurality of gate lines; a touch driving circuit to detect touch based on a change in capacitance of the plurality of touch electrodes; a compensation clock generating circuit to generate direct current (DC) compensation clocks for determining a DC compensation period based on clock signals that determine rising times and falling times of the plurality of scan signals. Also, the touch display device can include a DC voltage generating circuit to generate DC voltages based on a reference DC voltage; and a DC compensation voltage generating circuit to generate a DC compensation voltage based on one of the DC voltages and supply the DC compensation voltage to the display panel during the DC compensation period.

20 Claims, 24 Drawing Sheets

FIG.18
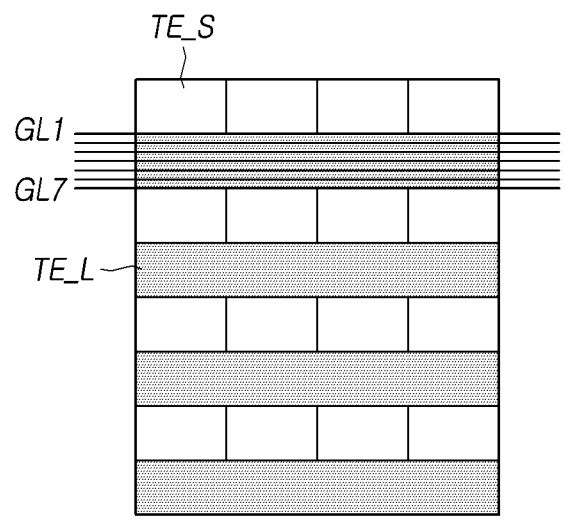
(a)
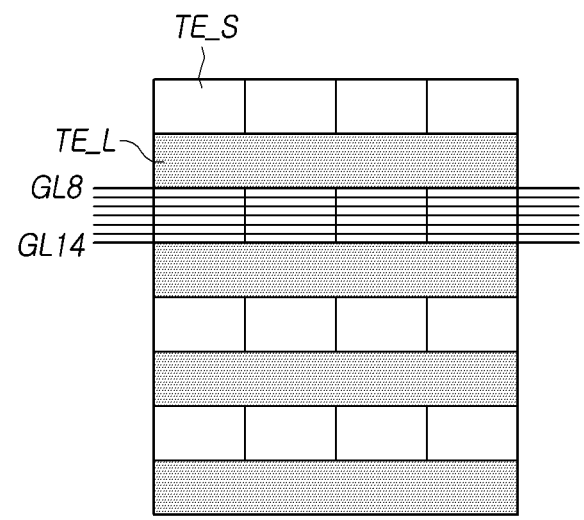
(b)

FIG.23
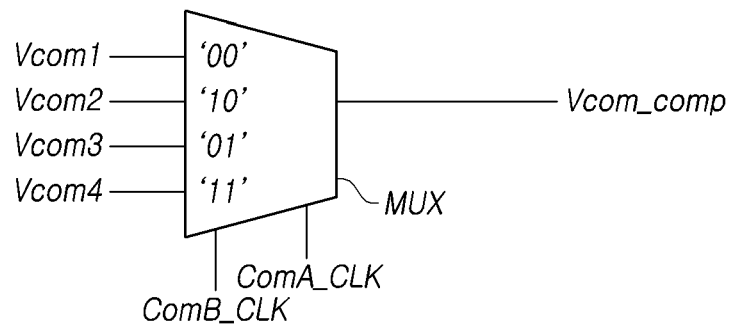
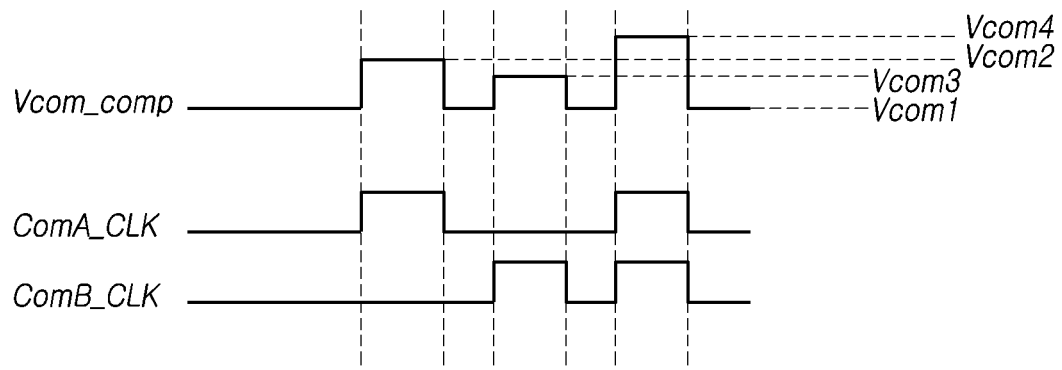
|  | ComA_CLK | ComB_CLK |
|---|---|---|
| Vcom1 | L | L |
| Vcom2 | H | L |
| Vcom3 | L | H |
| Vcom4 | H | H |

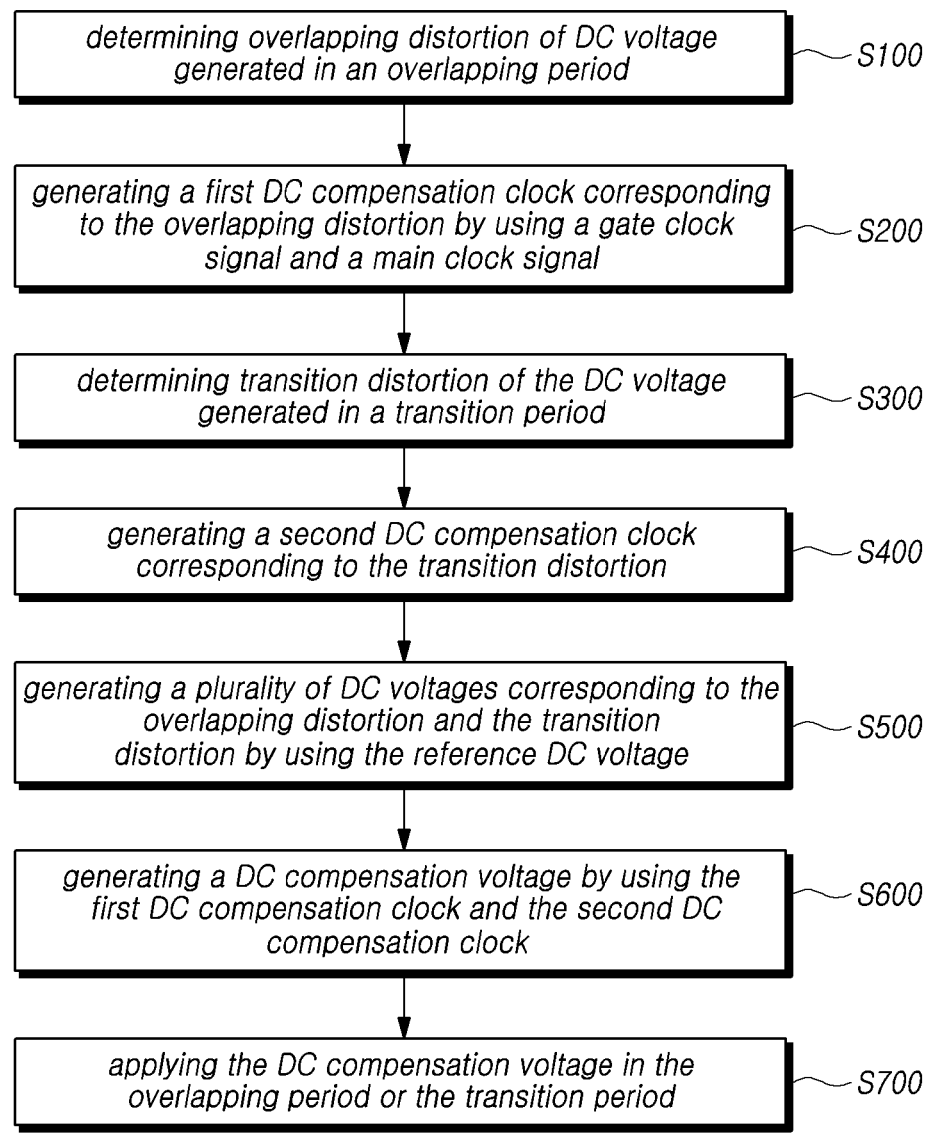

TOUCH DISPLAY DEVICE AND TOUCH DRIVING METHOD

CROSS-REFERENCE TO RELATED APPLICATION

This application claims priority under 35 U.S.C. § 119(a) to Korean Application No. 10-2022-0092300, filed in the Republic of Korea on Jul. 26, 2022, which is hereby incorporated by reference in its entirety into the present application.

TECHNICAL FIELD

Embodiments of the disclosure relate to a touch display device and a touch driving method.

BACKGROUND

With the development of multimedia, the importance of flat panel display devices is increasing. In response, flat panel display devices, such as liquid crystal displays, plasma display panels, and organic light emitting displays, have been commercialized.

Also in wide use are touch display devices that include a display device and a touch panel stacked on the display device to detect a touch point which undergoes a variation in resistance or capacitance due to a contact of a hand or a stylus pen and output information corresponding to the touch point or perform computation.

Such a touch display device is a type of user interface, and its applications are expanding to small portable terminal devices, office devices, mobile devices, and the like.

However, by having a separate touch panel stacked the display device, the touch display device is thicker and hard to slim down, and suffers from a reduction in light transmission efficiency and an increase in manufacturing costs. To address such issues, there have been recently proposed advanced in-cell touch (AIT) display devices having built-in touch electrodes in the pixel areas of the display panel.

In addition, such a touch display device is subjected to increased loads or larger amounts of noise induced in the built-in touch electrodes in the display panel due to an increase in size and resolution. Thus, the direct current (DC) voltage supplied to the touch electrode may become distorted, causing an error in the image displayed on the display panel. For example, having a large number of scan line lines packed closely together can result in different types of image defects, such as the appearance of faint horizontal line image defects becoming apparent or noticeable to a user, which can detract from the user's viewing experience.

SUMMARY OF THE DISCLOSURE

A touch display device and touch driving method capable of reducing distortion of DC voltage due to the load of the touch electrode is disclosed. For example, embodiments of the disclosure can accurately prevent ripples or distortion from occurring in the touch display device and respond to different types of situations with different levels of compensation at accurate timings, in order to better prevent and more accurately address potential image defects.

Embodiments of the disclosure can provide a touch display device and touch driving method, capable of effectively reducing distortion of DC voltage by classifying DC voltage distortions according to characteristics and applying a DC compensation voltage corresponding to the characteristic of the DC voltage distortion.

Embodiments of the disclosure can provide a touch display device and touch driving method, capable of effectively reducing distortion of DC voltage by generating a DC compensation voltage exactly corresponding to the period when a DC voltage distortion occurs.

Embodiments of the disclosure can provide a touch display device comprising a display panel including a plurality of touch electrodes, a gate driving circuit configured to apply a plurality of scan signals to the display panel through a plurality of gate lines, a touch driving circuit configured to detect touch according to a change in capacitance of the plurality of touch electrodes, a compensation clock generating circuit configured to generate DC compensation clocks for determining a DC compensation period by using clock signals that determines rising time and falling time of the plurality of scan signals, a DC voltage generating circuit configured to generate a plurality of DC voltages by using a reference DC voltage, and a DC compensation voltage generating circuit configured to generate a DC compensation voltage composed of the plurality of DC voltages by using the DC compensation clock.

Embodiments of the disclosure can provide a touch driving method of a touch display device including a gate driving circuit supplying a plurality of scan signals to a display panel including a plurality of touch electrodes and a touch driving circuit applying touch driving signals to the display panel and sensing a touch based on touch sensing signals received in response to the touch driving signals, the touch driving method includes determining overlapping distortion of DC voltage generated in an overlapping period, generating a first DC compensation clock corresponding to the overlapping distortion by using a gate clock signal and a main clock signal, determining transition distortion of the DC voltage generated in a transition period, generating a second DC compensation clock corresponding to the transition distortion, generating a DC compensation voltage by using the first DC compensation clock and the second DC compensation clock, and applying the DC compensation voltage in the overlapping period or the transition period.

According to embodiments of the disclosure, there can be provided a touch display device and touch driving method capable of reducing distortion of DC voltage due to the load of the touch electrode.

According to embodiments of the disclosure, there can be provided a touch display device, touch driving circuit, and touch driving method, capable of effectively reducing distortion of DC voltage by classifying different types of DC voltage distortions according to specific characteristics and applying a DC compensation voltage corresponding to the specific characteristic of the DC voltage distortion.

According to embodiments of the disclosure, there can be provided a touch display device and touch driving method, capable of effectively reducing distortion of DC voltage by generating a DC compensation voltage that exactly corresponds to the period when a DC voltage distortion occurs.

BRIEF DESCRIPTION OF THE DRAWINGS

The above and other aspects, features and other advantages of the present disclosure will be more clearly understood from the following detailed description taken in conjunction with the accompanying drawings, which are described below.

FIG. 18, including parts (a) and (b), shows views illustrating an example of a shape of a touch electrode corresponding to a position of a gate line in a touch display device according to embodiments of the disclosure;

FIG. 23 is a block diagram illustrating an example of a circuit of generating a DC compensation voltage in a touch display device according to embodiments of the disclosure.

FIG. 24 is a flowchart illustrating a touch driving method according to embodiments of the disclosure.

DETAILED DESCRIPTION OF THE EMBODIMENTS

Figure 1:
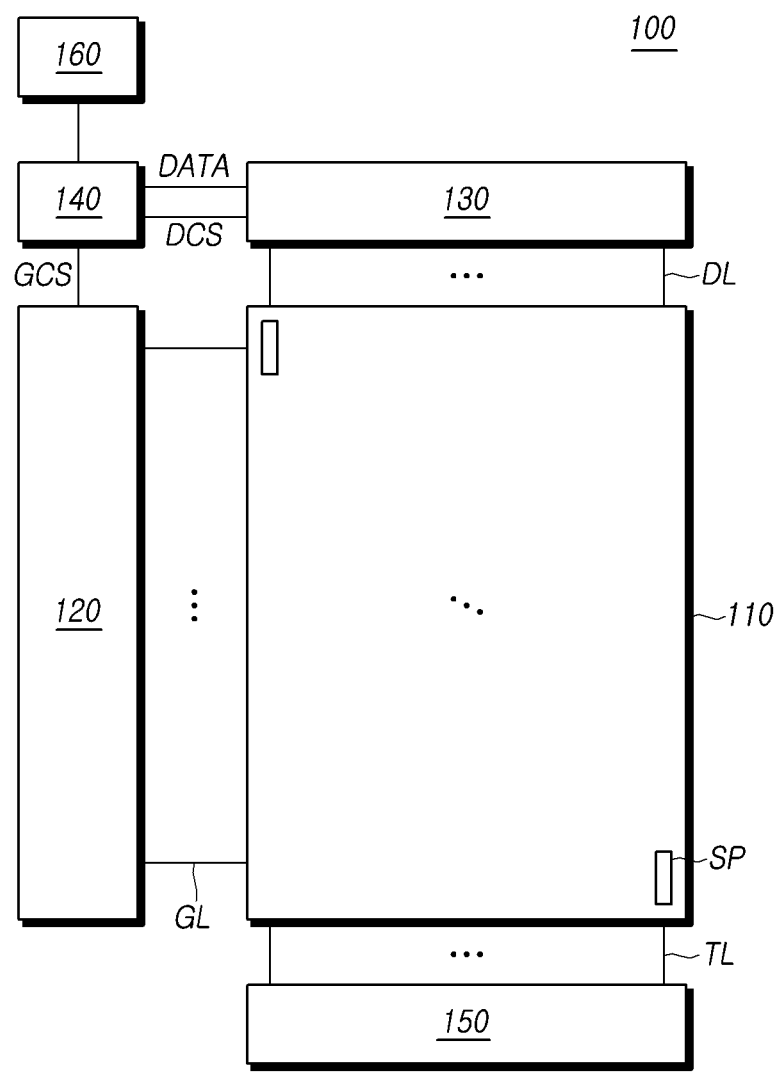
FIG. 1 is a view schematically illustrating a touch display device according to embodiments of the disclosure.

Hereinafter, some embodiments of the disclosure will be described in detail with reference to example drawings. In the following description of examples or embodiments of the disclosure, reference will be made to the accompanying drawings in which it is shown by way of illustration specific examples or embodiments that can be implemented, and in which the same reference numerals and signs can be used to determine the same or like components even when they are shown in different accompanying drawings from one another. Further, in the following description of examples or embodiments of the disclosure, detailed descriptions of well-known functions and components incorporated herein will be omitted when it is determined that the description can make the subject matter in some embodiments of the disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" can be used herein to describe elements of the disclosure. Each of these terms is not used to define essence, order, sequence, or number of elements etc., but is used merely to distinguish the corresponding element from other elements.

When it is mentioned that a first element "is connected or coupled to," "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element can be included in at least one of two or more elements that "are connected or coupled to," "contact or overlap," etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "can" fully encompasses all the meanings of the term "can."

The features of various embodiments of the present disclosure can be partially or entirely coupled to or combined with each other and can be interlocked and operated in technically various ways, and the embodiments can be carried out independently of or in association with each other.

Hereinafter, various embodiments of the disclosure will be described in detail with reference to the accompanying drawings.

FIG. 1 is a view schematically illustrating a touch display device according to embodiments of the disclosure.

Referring to FIG. 1, a touch display device 100 according to embodiments of the disclosure can include a display panel 110, a gate driving circuit 120, a data driving circuit 130, and a timing controller 140. The touch display device 100 can also include a touch driving circuit 150 and a power management circuit 160 for sensing a touch. Also, according to an embodiment, one or more of the gate driving circuit 120, the data driving circuit 130, the timing controller 140 and the power management circuit 160 can be collectively referred to as a controller, but embodiments are not limited thereto.

The display panel 110 can include a plurality of gate lines GL, a plurality of data lines DL, and multiple subpixels SP at the crossings of the gate lines GL and the data lines DL.

Multiple touch electrodes can be arranged or embedded in the display panel 110, and multiple touch lines TL for electrically connecting the touch electrodes with the touch driving circuit 150 can be arranged on the display panel 110.

A configuration for display driving in the display device 100 is described first. The gate driving circuit 120 controls the driving timing of the subpixels SP arranged in the display panel 110. The data driving circuit 130 supplies a data voltage corresponding to image data to the subpixel SP. As a result, the subpixel SP emits light with a brightness corresponding to the gray level of the image data to display the image.

Specifically, the gate driving circuit 120 can be controlled by the timing controller 140 to sequentially output scan signals to the plurality of gate lines GL disposed in the display panel 110, controlling the driving timing of the subpixels SP.

The gate driving circuit 120 can include one or more gate driving integrated circuits GDIC. Depending on driving schemes, the gate driving circuit 120 can be positioned on only one side, or each of two opposite sides, of the display panel 110. The gate driving circuit 120 can be implemented in a gate-in-panel (GIP) form which is directly embedded in the bezel area of the display panel 110.

The data driving circuit 130 receives digital image data DATA from the timing controller 140 and converts the image data DATA into an analog data voltage. The data driving circuit 130 outputs a data voltage to each data line DL according to the timing of applying a scan signal via the gate line GL, allowing each subpixel SP to represent a brightness according to the data voltage.

The data driving circuit 130 can include one or more source driving integrated circuits SDIC.

The timing controller 140 supplies various control signals to the gate driving circuit 120 and the data driving circuit 130 and controls the operation of the gate driving circuit 120 and the data driving circuit 130.

The timing controller 140 enables the gate driving circuit 120 to output scan signals according to the timing of implementing each frame, converts image data received from outside the display device 100 (e.g., a host system) to meet the data signal format used by the data driving circuit 130, and outputs the resultant image data DATA to the data driving circuit 130.

The timing controller 140 receives, from the outside (e.g., a host system), various timing signals including a vertical synchronization signal, a horizontal synchronization signal, an input data enable signal, and a clock signal, along with the image data DATA.

The timing controller 140 can generate a data control signal DCS and a gate control signal GCS according to various timing signals received from the outside and can output them to the data driving circuit 130 and the gate driving circuit 120, respectively.

As an example, to control the gate driving circuit 120, the timing controller 140 outputs various gate control signals GCS including a gate start pulse, a gate shift clock, and a gate output enable signal.

The gate start pulse controls the operation start time of one or more gate driving integrated circuits constituting the gate driving circuit 120. The gate shift clock is a clock signal commonly input to one or more gate driving integrated circuits and controls the shift timing of the scan signals. The gate output enable signal determines timing information about one or more gate driving integrated circuits.

To control the data driving circuit 130, the timing controller 140 outputs various data control signals DCS including for example, a source start pulse, a source sampling clock, and a source output enable signal.

The source start pulse controls the data sampling start time of one or more source driving integrated circuits constituting the data driving circuit 130. The source sampling clock is a clock signal for controlling the sampling timing of data in each source driving integrated circuit. The source output enable signal controls the output time of the data driving circuit 130.

The touch display device 100 can include a touch driving circuit 150 that performs touch sensing and stylus sensing according to the signal received through the display panel 110 by driving the display panel 110 having a built-in touchscreen panel.

The touch driving circuit 150 can include a first circuit for applying the touch driving signal to the touch electrodes constituting the display panel 110 and receiving the touch sensing signal through the sensing line SL and a second circuit for detecting whether there are passive touch sensing (finger touch sensing) and active touch sensing using the sensing signal received through the display panel 110.

The first circuit can be referred to as a touch sensing circuit (read out integrated circuit (ROIC)), and the second circuit can be referred to as a touch controller.

The touch driving circuit 150 can sense the presence and/or position of a touch based on a deviation in capacitance between the touch electrodes formed on the display panel 110. In other words, a deviation in capacitance occurs between a position touched by a passive stylus including the user's finger or an active stylus and a non-touch position. The touch driving circuit 150 senses the presence and position of a touch in such a manner as to detect the capacitance deviation. The touch driving circuit 150 generates a touch sensing output signal about the presence and/or position of a touch, and transfers it to an external micro control unit.

The micro control unit controls the touch driving circuit 150. The micro control unit can receive a touch synchronization signal from a timing controller 140 and generate a touch driving signal for controlling the touch driving circuit 150 based on the received touch synchronization signal. The micro control unit transmits and receives a touch sensing signal and a touch driving signal based on an interface defined between it and the touch driving circuit 150.

The micro control unit can be integrated with either one of the touch controller TCR or the timing controller into a single integrated circuit. When the micro control unit and the touch controller are integrated into a single integrated circuit, the touch sensing circuit ROIC can be referred to as a touch driving circuit.

The touch display device 100 can further include a power management circuit 160 that supplies various voltages or currents to for example, the display panel 110, the gate driving circuit 120, the data driving circuit 150, and the touch driving circuit 150 or controls various voltages or currents to be supplied.

The power management circuit 160 adjusts the direct current (DC) input voltage supplied from the host system, and generates power required to drive the display panel 110, the gate driving circuit 120, the data driving circuit 130, and the touch driving circuit 150.

The data driving circuit 130 applying the data voltage to the data line DL is also referred to as a source driving circuit or a source driving integrated circuit SDIC, and the touch driving circuit 150 and the data driving circuit 130 can be together implemented as an integrated driving circuit SRIC.

In this situation, the integrated driving circuit SRIC can be of a chip on film (COF) type mounted on a film and can be embedded in the display panel 110 or mounted on a printed circuit board (PCB).

The film on which the integrated driving circuit SRIC is mounted can be coupled to each of the bonding unit of the display panel 110 and the bonding unit of the printed circuit board (PCB).

A touch controller can be mounted on the printed circuit board (PCB).

The touch driving circuit 150 and the data driving circuit 130 can be integrated in separate driving chips. The touch driving circuit 150 can be electrically connected to a plurality of touch electrodes constituting the display panel 110 through a plurality of sensing lines.

In this situation, the touch driving circuit 150 can perform touch sensing in a time-divided touch driving period separately from the display driving period. The touch driving period for performing touch sensing can proceed simultaneously with the display driving period.

When an encapsulation layer is formed on the display panel 110, and the touch electrode is disposed thereon, the capacitance for driving the touch electrode may increase. Thus, it can be necessary to increase the level or power of the touch driving signal for driving the touch electrode. To this end, a level shifter can be added between the touch driving circuit 150 and the display panel 110 to control the level of the touch driving signal.

Each subpixel SP can be defined by the crossing of the gate line GL and the data line DL, and liquid crystals or a light emitting element can be disposed in each subpixel SP depending on the type of the touch display device 100.

As an example, when the display device 100 is a liquid crystal display device, the display device 100 can include a light source device, such as a backlight unit, to emit light to the display panel 110. Liquid crystals are disposed in the subpixel SP of the display panel 110. The alignment of liquid crystals can be adjusted by an electric field created as data voltage is applied to each subpixel SP, thereby representing a brightness according to the data voltage and displaying an image.

In the situation of a liquid crystal display device, the display panel 110 can include a liquid crystal layer formed between two substrates and can be operated in any known mode, such as a twisted nematic (TN) mode, a vertical alignment (VA) mode, an in-plane switching (IPS) mode, or a fringe field switching (FFS) mode. In the situation of an organic light emitting display device, the display panel 110 can be implemented in a top emission scheme, a bottom emission scheme, or a dual-emission scheme.

Meanwhile, the display device 100 according to embodiments of the disclosure can detect the user's touch on the display panel 110 using the touch driving circuit 150 and the touch electrodes included in the display panel 110.

Figure 2:
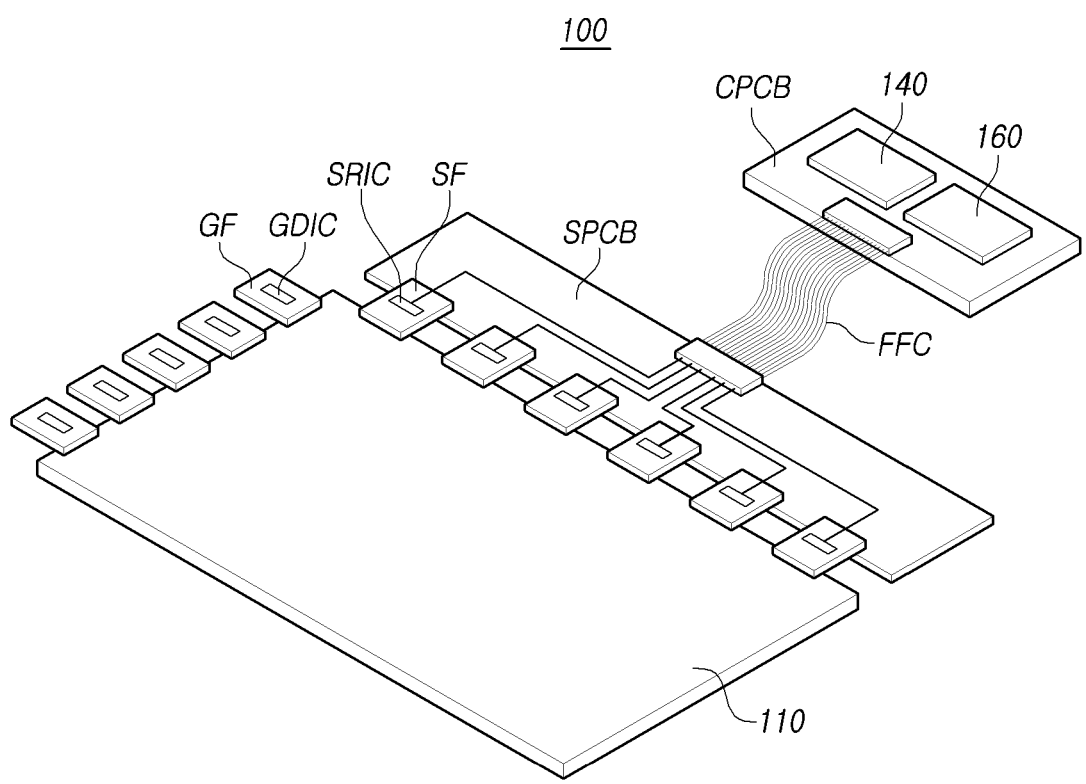
FIG. 2 is a view illustrating an example of a system of a touch display device according to embodiments of the disclosure.

FIG. 2 is a view illustrating an example of a system of a touch display device according to embodiments of the disclosure.

Referring to FIG. 2, in the touch display device 100 according to embodiments of the disclosure, the integrated circuit SRIC in which the data driving circuit 130 and the touch driving circuit 150 are integrated with each other and the gate driving integrated circuit GDIC are implemented in the chip-on-film (COF) type among various types (e.g., TAB, COG, or COF).

One or more gate driving integrated circuits GDIC each can be mounted on a gate film GF, and one side of the gate film GF can be electrically connected with the display panel 110. Lines for electrically connecting the gate driving integrated circuit GDIC and the display panel 110 can be disposed on the gate film GF.

Likewise, one or more integrated driving circuits SRIC each can be mounted on the source film SF, and one side of the source film SF can be electrically connected with the display panel 110. Lines for electrically connecting the integrated driving circuit SRIC and the display panel 110 can be disposed on the source film SF.

The display device 100 can include at least one source printed circuit board SPCB for circuit connection between a plurality of integrated driving circuits SRIC and other devices and a control printed circuit board CPCB for mounting control components and various electric devices.

The other side of the source film SF where the integrated driving circuit SRIC is mounted can be connected to at least one source printed circuit board SPCB. In other words, one side of the source film SF where the integrated driving circuit SRIC is mounted can be electrically connected with the display panel 110, and the other side thereof can be electrically connected with the source printed circuit board SPCB.

The timing controller 140 and the power management circuit (power management IC) 160 can be mounted on the control printed circuit board CPCB. The timing controller 140 can control the operation of the data driving circuit 130, the gate driving circuit 120, and the touch driving circuit 150. The power management circuit 160 can supply driving voltage or current to the display panel 110, the data driving circuit 130, the gate driving circuit 120, and the touch driving circuit 150 and control the supplied voltage or current.

At least one source printed circuit board SPCB and control printed circuit board CPCB can be circuit-connected through at least one connection member. The connection member can include, e.g., a flexible printed circuit FPC or a flexible flat cable FFC. In this situation, the connection member connecting the at least one source printed circuit board SPCB and control printed circuit board CPCB can be varied depending on the size and type of the touch display device 100. The at least one source printed circuit board SPCB and control printed circuit board CPCB can be integrated into a single printed circuit board.

In the so-configured touch display device 100, the power management circuit 160 transfers a driving voltage necessary for display driving or characteristic value sensing to the source printed circuit board SPCB through the flexible printed circuit FPC or flexible flat cable FFC. The driving voltage transferred to the source printed circuit board SPCB is supplied to emit light or sense a specific subpixel SP in the display panel 110 through the source driving integrated circuit SDIC.

Each of the subpixels SP arranged in the display panel 110 in the display device 100 can include an organic light emitting diode, which is an example of a light emitting element, and a circuit element, e.g., a driving transistor, for driving the organic light emitting diode.

The type and number of circuit elements constituting each subpixel SP can be varied depending on functions to be provided and design schemes.

The touch display device 100 can be various types of devices, such as a liquid crystal display device, an organic light emitting display device, a plasma display panel, and a quantum dot display, but embodiments are not limited thereto.

The touch display device 100 can be used in mobile devices such as smartphones and tablet PCs, and can be used in large screen display devices such as automobile displays and exhibition displays.

For example, when the touch display device 100 according to embodiments of the present disclosure is an organic light emitting display device, it can include a first electrode (anode electrode), an organic light emitting layer and a second electrode (cathode electrode) constituting the organic light emitting diode, an encapsulation layer located thereon and having a sealing function, and a touch sensor metal layer located thereon. At this time, a plurality of touch electrodes TE can be formed at the touch sensor metal layer or can be formed at the second electrode layer constituting the cathode electrode of the organic light emitting diode.

Figure 3:
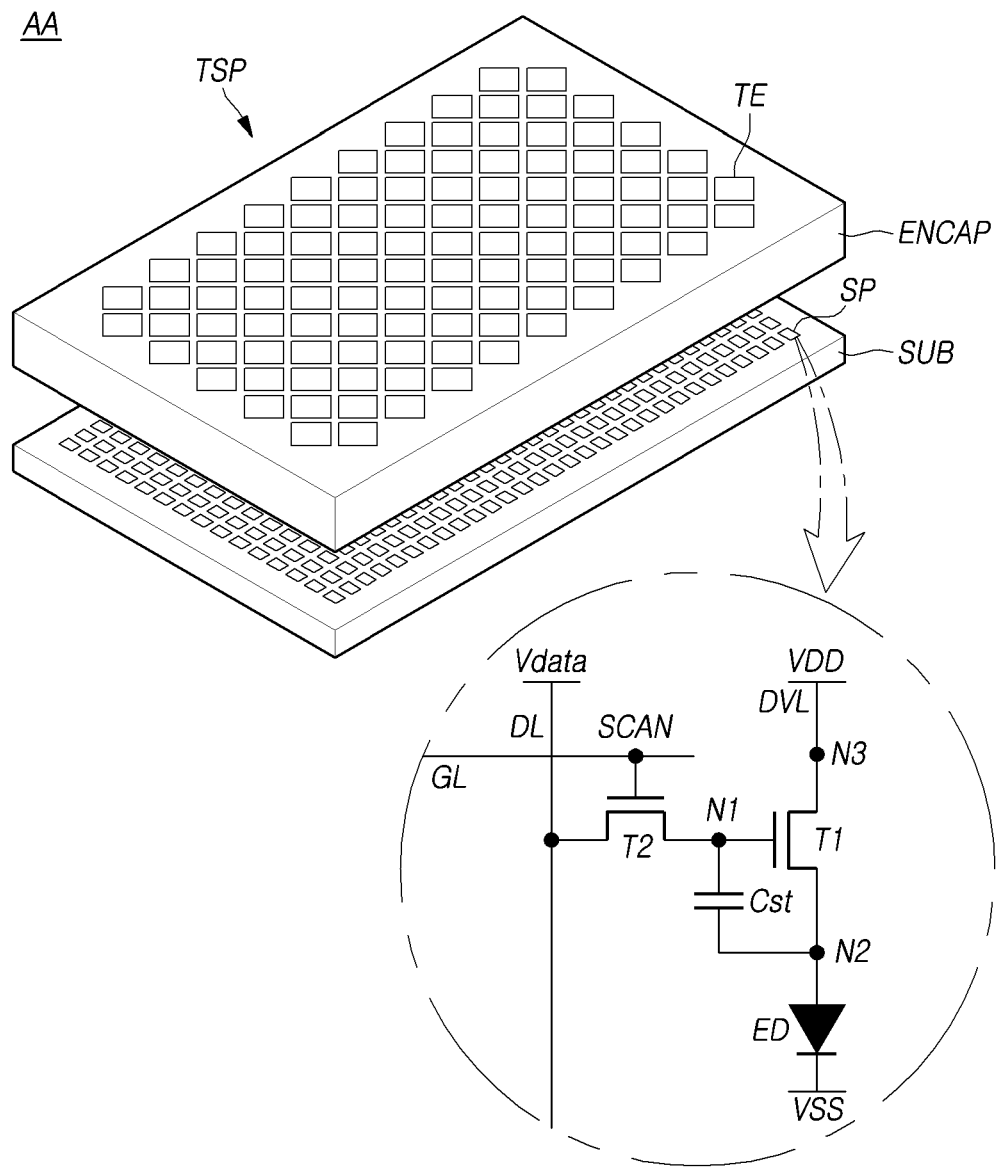
FIG. 3 is a view illustrating an example of a structure in which a touchscreen panel is embedded in a display panel in a touch display device according to embodiments of the disclosure.

FIG. 3 is a view illustrating an example of a structure in which a touchscreen panel is embedded in a display panel in a touch display device according to embodiments of the disclosure.

Referring to FIG. 3, in the touch display device 100 according to embodiments of the disclosure, a plurality of subpixels SP are arranged on the substrate SUB in the display area AA of the display panel 110.

Each subpixel SP can include a light emitting element ED, a first transistor T1 for driving the light emitting element ED, a second transistor T2 for transferring a data voltage Vdata to a first node N1 of the first transistor T1, and a storage capacitor Cst for maintaining a constant voltage during one frame.

The first transistor T1 can include the first node N1 to which the data voltage Vdata can be applied through the second transistor T2, a second node N2 electrically connected with the light emitting element ED, and a third node N3 to which a driving voltage VDD is applied from a driving voltage line DVL. The first node N1 can be a gate node, the second node N2 can be a source node or a drain node, and the third node N3 can be the drain node or the source node. The first transistor T1 is referred to as a driving transistor for driving the light emitting element ED.

The light emitting element ED can include a first electrode (e.g., an anode electrode), a light emitting layer, and a second electrode (e.g., a cathode electrode). The first electrode can be referred to as a pixel electrode and is electrically connected with the second node N2 of the first transistor T1. The second electrode can be referred to as a common electrode and can be received a base voltage VSS.

The light emitting layer in the light emitting element ED can be an organic light emitting layer containing an organic material. In this situation, the light emitting element ED can be an organic light emitting diode.

The second transistor T2 can be on/off controlled by a scan signal SCAN applied via the gate line GL and be electrically connected between the first node N1 of the first transistor T1 and the data line DL. The second transistor T2 can be referred to as a switching transistor.

If the second transistor T2 is turned on by the scan signal SCAN, the data voltage Vdata supplied through the data line DL is transferred to the first node N1 of the first transistor T1.

The storage capacitor Cst can be electrically connected between the first node N1 and second node N2 of the first transistor T1.

Each subpixel SP can have a 2T1C structure which includes two transistors T1 and T2 and one capacitor Cst and, in some situations, each subpixel SP can further include one or more transistors or one or more capacitors.

The storage capacitor Cst can be not the parasitic capacitor which can be present between the first node N1 and second node N2 of the first transistor T1, but an external capacitor intentionally designed outside the first transistor T1.

Each of the first transistor T1 and the second transistor T2 can be an n-type transistor or a p-type transistor.

Circuit elements, such as the light emitting element ED, two or more transistors T1 and T2, and one or more capacitors Cst, are disposed on the display panel 110. Since the circuit elements are vulnerable to external moisture or oxygen, an encapsulation layer ENCAP for preventing external moisture or oxygen from penetrating into the circuit elements can be disposed on the display panel 110.

In the touch display device 100 according to embodiments of the disclosure, the touchscreen panel TSP can be formed on the encapsulation layer ENCAP and embedded in the display panel 110. In other words, in the touch display device 100, the plurality of touch electrodes TE constituting the touchscreen panel TSP can be disposed on the encapsulation layer ENCAP to configure the display panel 110.

As a capacitance-based touch sensing scheme, the touch display device 100 can sense a touch using a mutual capacitance scheme or a self-capacitance scheme.

In the situation of a mutual capacitance-based touch sensing scheme, the plurality of touch electrodes TE can be divided into touch driving electrodes to which touch driving signals are applied through touch driving lines and touch sensing electrodes where touch sensing signals are sensed through the touch sensing lines and which, together with the touch driving electrodes, form capacitance. In this situation, the touch driving line and the touch sensing line can be collectively referred to as a touch line, and the touch driving signal and the touch sensing signal can be collectively referred to as a touch signal.

In the situation of such a mutual capacitance-based touch sensing scheme, the presence or absence of a touch and touch coordinates are detected based on a change in the mutual capacitance caused between the touch driving electrode and the touch sensing electrode according to the presence or absence of a pointer, such as a finger or a pen.

In the self-capacitance-based touch sensing scheme, each touch electrode TE plays a role both as a touch driving electrode and as a touch sensing electrode. In other words, the touch driving signal is applied to the touch electrode TE through one touch line, and the touch sensing signal transferred from the touch electrode TE to which the touch driving signal is applied is received through the same touch line. Accordingly, in the self-capacitance-based touch sensing scheme, there is no distinction between the touch driving electrode and the touch sensing electrode and no distinction between the touch driving line and the touch sensing line.

In the situation of such a self-capacitance-based touch sensing scheme, the presence or absence of a touch and touch coordinates are detected based on a change in capacitance caused between a pointer, such as a finger or a pen, and the touch electrode TE.

As such, the touch display device 100 can sense a touch in the mutual capacitance-based touch sensing scheme or self-capacitance-based touch sensing scheme.

Figure 4:
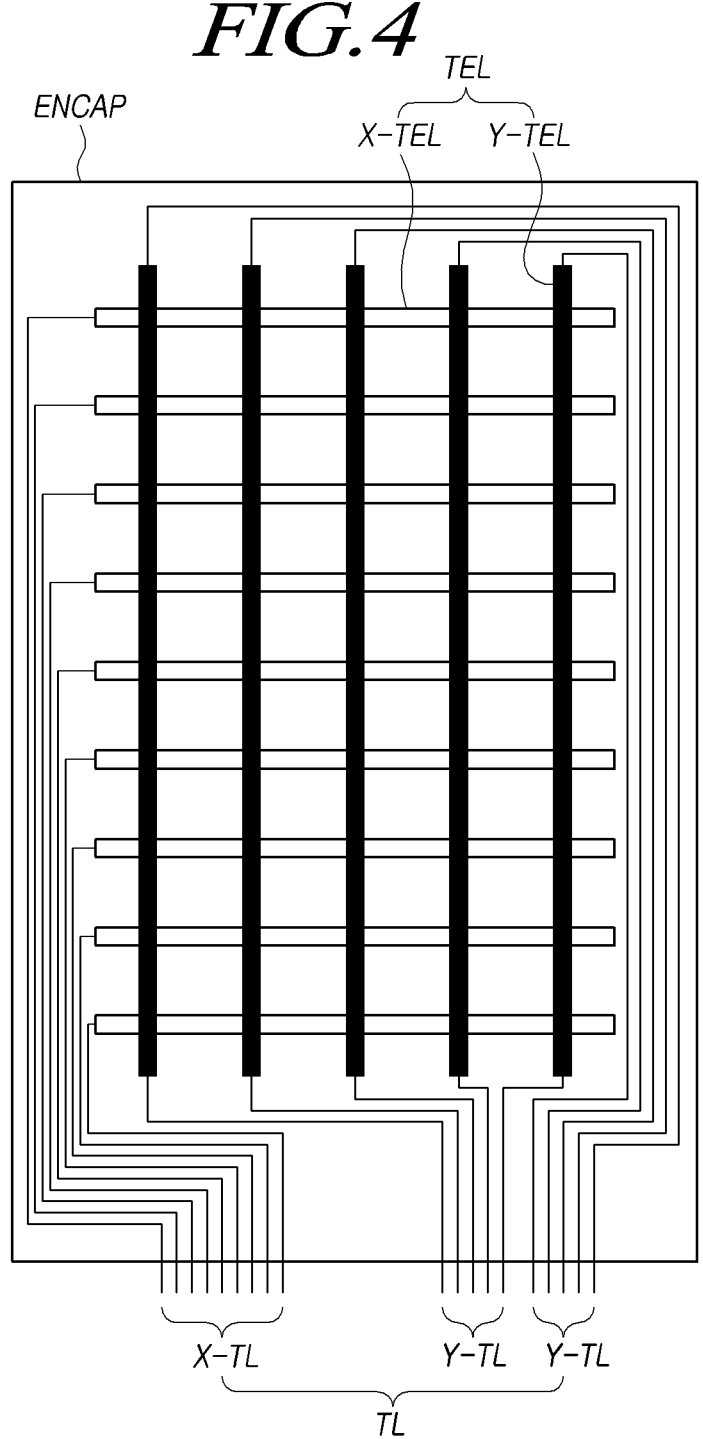
FIG. 4 is a view schematically illustrating a touch electrode structure for mutual capacitance-based touch sensing in a touch display device according to embodiments of the disclosure.

FIG. 4 is a view schematically illustrating a touch electrode structure for mutual capacitance-based touch sensing in a touch display device according to embodiments of the disclosure.

Referring to FIG. 4, a touch electrode structure for mutual capacitance-based touch sensing in the touch display device 100 according to embodiments of the disclosure can include a plurality of X-touch electrode lines X-TEL and a plurality of Y-touch electrode lines Y-TEL. The plurality of X-touch electrode lines X-TEL and the plurality of Y-touch electrode lines Y-TEL are positioned on the encapsulation layer ENCAP.

The plurality of X-touch electrode lines X-TEL each can be disposed in a first direction, and the plurality of Y-touch electrode lines Y-TEL each can be disposed in a second direction different from the first direction. For example, the plurality of X-touch electrode lines X-TEL can be perpendicular to the plurality of Y-touch electrode lines Y-TEL.

In the disclosure, the first direction and the second direction can be relatively different directions. As an example, the first direction can be the x-axis direction, and the second direction can be the y-axis direction. In contrast, the first direction can be the y-axis direction, and the second direction can be the x-axis direction. The first direction and the second direction can be, or may not be, perpendicular to each other. In the disclosure, row and column are relative terms, and from a point of view, the terms "row" and "column" can be interchangeably used.

Each of the X-touch electrode lines X-TEL can be constituted of a plurality of X-touch electrodes electrically connected with each other. Each of the Y-touch electrode lines Y-TEL can be constituted of a plurality of Y-touch electrodes electrically connected with each other.

The plurality of X-touch electrodes and the plurality of Y-touch electrodes are included in the plurality of touch electrodes TE and whose roles (functions) are distinguished.

For example, the plurality of X-touch electrodes respectively constituting the plurality of X-touch electrode lines X-TEL can be touch driving electrodes, and the plurality of Y-touch electrodes respectively constituting the plurality of Y-touch electrode lines Y-TEL can be touch sensing electrodes. In this situation, the plurality of X-touch electrode lines X-TEL respectively correspond to touch driving electrode lines, and the plurality of Y-touch electrode lines Y-TEL respectively correspond to touch sensing electrode lines.

Conversely, the plurality of X-touch electrodes respectively constituting the plurality of X-touch electrode lines X-TEL can be touch sensing electrodes, and the plurality of Y-touch electrodes respectively constituting the plurality of Y-touch electrode lines Y-TEL can be touch driving electrodes. In this situation, the plurality of X-touch electrode lines X-TEL respectively correspond to touch sensing electrode lines, and the plurality of Y-touch electrode lines Y-TEL respectively correspond to touch driving electrode lines.

A touch sensor metal for touch sensing can include a plurality of touch lines TL as well as the plurality of X-touch electrode lines X-TEL and the plurality of Y-touch electrode lines Y-TEL.

The plurality of touch lines TL can include one or more X-touch lines X-TL respectively connected to the plurality of X-touch electrode lines X-TEL and one or more Y-touch lines Y-TL respectively connected to the plurality of Y-touch electrode lines Y-TEL. For example, two Y-touch lines Y-TL can be connected to opposite ends of each one of the plurality of Y-touch electrode lines Y-TEL for better sensing of the touch signals.

Figure 5:
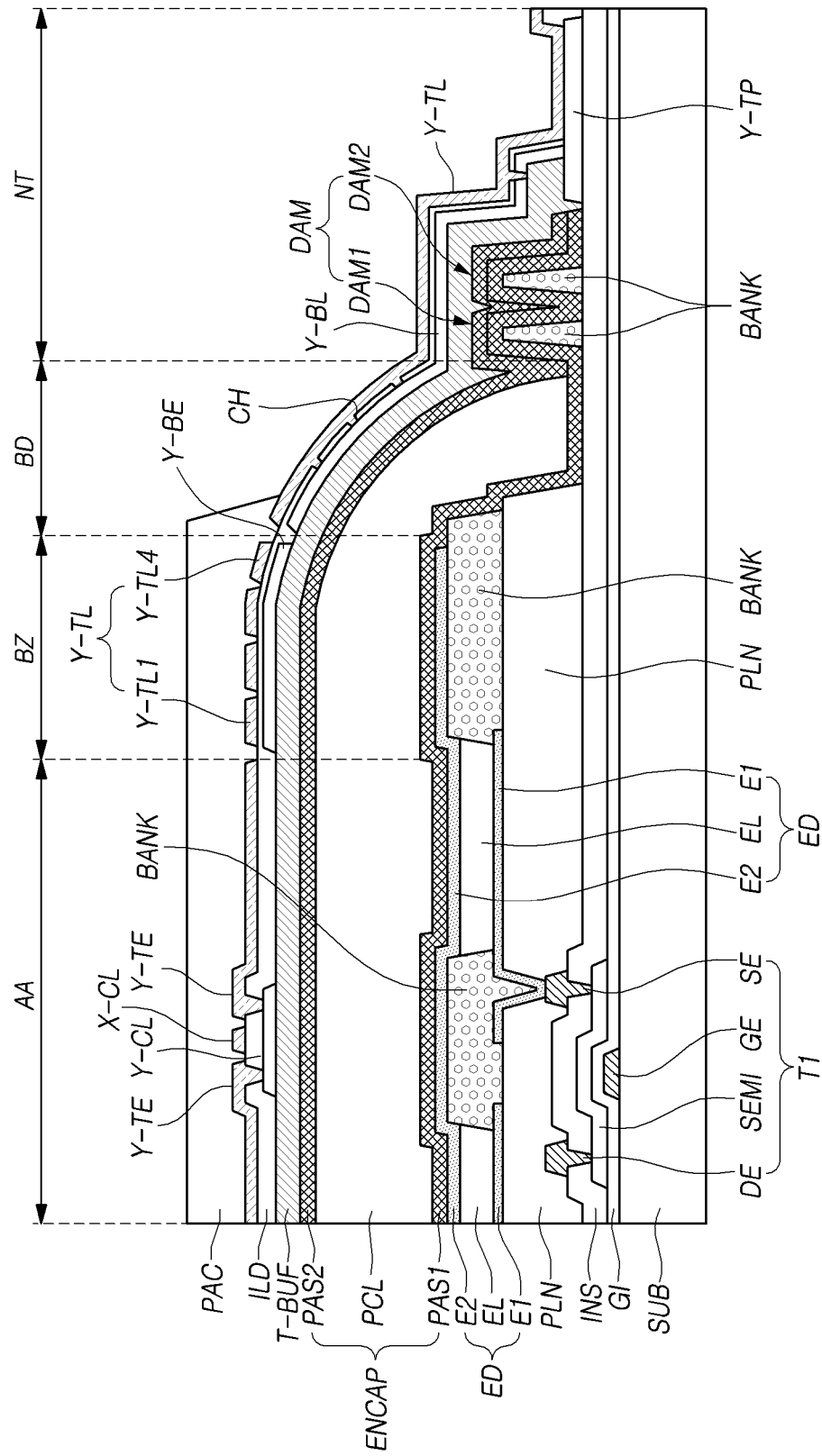
FIG. 5 is a cross-sectional view exemplarily illustrating a touch display device according to embodiments of the disclosure.

FIG. 5 is a cross-sectional view illustrating an example of a touch display device according to embodiments of the disclosure.

FIG. 5 illustrates a plate-type Y-touch electrode Y-TE, but this is merely an example. For example, a mesh-type touch electrode TE can be used.

Referring to FIG. 5, in the touch display device according to embodiments of the disclosure, a first transistor T1, as a driving transistor, can be disposed on the substrate SUB in the subpixel SP positioned in the display area AA.

The first transistor T1 can include a gate electrode GE, a source electrode SE, a drain electrode DE, and a semiconductor layer SEMI. In this situation, the source electrode SE and the drain electrode DE can be formed of the same material as the first node electrode NE1 and the second node electrode NE2 positioned in the bending area BD.

The gate electrode GE and the semiconductor layer SEMI can overlap each other, with the gate insulation film GI interposed therebetween. The source electrode SE can be formed on an insulation layer INS to contact one side of the semiconductor layer SEMI, and the drain electrode DE can be formed on the insulation layer INS to contact the other side of the semiconductor layer SEMI.

The light emitting element ED can include a first electrode E1, which corresponds to the anode electrode (or cathode electrode), a light emitting layer EL formed on the first electrode E1, and a second electrode E2 formed on the light emitting layer EL and corresponding to the cathode electrode (or anode electrode).

The first electrode E1 is electrically connected with the source electrode SE of the first transistor T1, exposed through a contact hole which passes through a planarization film PLN.

The light emitting layer EL is formed on the first electrode E1 in an emission area defined by a bank BANK. The light emitting layer EL can be formed in the order of hole-related layer, light emitting layer, and electron-related layer, or its reverse order, on the first electrode E1. The second electrode E2 can be formed to face the first electrode E1, with the light emitting layer EL disposed therebetween.

The encapsulation layer ENCAP blocks or at least reduces penetration of external moisture or oxygen into the light emitting element ED which is vulnerable to external moisture or oxygen. The encapsulation layer ENCAP can be formed of one layer or can include a stacked structure of a plurality of layers PAS1, PCL, and PAS2.

For example, where the encapsulation layer ENCAP is formed of a stacked structure of a plurality of layers PAS1, PCL, and PAS2, the encapsulation layer ENCAP can include one or more inorganic encapsulation layers PAS1 and PAS2 and one or more organic encapsulation layer PCL. As a specific example, in the encapsulation layer ENCAP, the first inorganic encapsulation layer PAS1, the organic encapsulation layer PCL, and the second inorganic encapsulation layer PAS2 can be stacked in the order thereof.

The encapsulation layer ENCAP can further include at least one organic encapsulation layer or at least one inorganic encapsulation layer.

The first inorganic encapsulation layer PAS1 is formed on the substrate SUB where the second electrode E2 corresponding to the cathode electrode is formed, to be positioned most adjacent to the light emitting element ED. The first inorganic encapsulation layer PAS1 is formed of an inorganic insulation material capable of low-temperature deposition, such as for example, silicon nitride (SiNx), silicon oxide (SiOx), silicon oxynitride (SiON), or aluminum oxide ($Al_2O_3$). Since the first inorganic encapsulation layer PAS1 is deposited at low-temperature atmosphere, the first inorganic encapsulation layer PAS1 can prevent damage to the light emitting layer EL including the organic material vulnerable to high-temperature atmosphere during deposition.

The organic encapsulation layer PCL can be formed in a smaller area than the first inorganic encapsulation layer PAS1 in which the organic encapsulation layer PCL can be formed to expose both end tips of the first inorganic encapsulation layer PAS1. The organic encapsulation layer PCL serves to mitigate stress between the layers due to a warping of the touch display device 100 which is an OLED device, while reinforcing the planarization performance. The organic encapsulation layer PCL can be formed of, e.g., an acrylic resin, epoxy resin, polyimide, polyethylene, silicon oxycarbide (SiOC), or other organic insulation materials.

Where the organic encapsulation layer PCL is formed in an inkjet method, one or more dams DAM can be formed in the boundary area between the non-display area and the display area AA or the dam area which corresponds to a portion of the non-display area.

For example, the dam area can be positioned between the display area AA and the pad area where the plurality of touch pads are formed in the non-display area and, in the dam area, a primary dam DAM1 adjacent to the display area AA, and a secondary dam DAM2 adjacent to the pad area can exist.

The one or more dams DAM disposed in the dam area can prevent or at least reduce the liquid-state organic encapsulation layer PCL from collapsing to or spilling over into the non-display area and resultantly penetrating into the pad area when the liquid-phase organic encapsulation layer PCL is loaded on the display area AA.

The primary dam DAM1 or the secondary dam DAM2 can be formed in a single-layer structure or multi-layer structure. For example, the primary dam DAM1 or the secondary dam DAM2 can simultaneously be formed of the same material as at least one of the bank BANK and a spacer. In this situation, a dam structure can be formed without a masking process or increase in manufacturing cost.

The primary dam DAM1 or the secondary dam DAM2 can be structured so that the first inorganic encapsulation layer PAS1 and the second inorganic encapsulation layer PAS2 are stacked on the bank BANK. In this situation, the organic encapsulation layer PCL containing an organic material can be positioned on an inner surface of the primary dam DAM1 or be positioned on the top of at least a portion of the primary dam DAM1 and the secondary dam DAM2.

The second inorganic encapsulation layer PAS2 can be formed over the substrate SUB, where the organic encapsulation layer PCL is formed, to cover the upper surface and side surfaces of each of the organic encapsulation layer PCL and the first inorganic encapsulation layer PAS1. The second inorganic encapsulation layer PAS2 reduces or blocks penetration of external moisture or oxygen into the first inorganic encapsulation layer PAS1 and the organic encapsulation layer PCL. The second inorganic encapsulation layer PAS2 is formed of an inorganic insulation material, such as, e.g., silicon nitride (SiNx), silicon oxide (SiOx), silicon oxynitride (SiON), or aluminum oxide ($Al_2O_3$).

A touch buffer layer T-BUF can be disposed on the encapsulation layer ENCAP. The touch buffer layer T-BUF can be positioned between the touch sensor metal including the touch electrodes X-TE and Y-TE and the touch electrode connection lines X-CL and Y-CL, and the second electrode E2 of the light emitting element ED.

The touch buffer layer T-BUF can be designed to maintain a predetermined minimum spacing (e.g., 1 µm) between the touch sensor metal and the second electrode E2 of the light emitting element ED. Thus, it is possible to reduce or prevent the parasitic capacitance formed between the touch sensor metal and the second electrode E2 of the light emitting element ED and hence reduce or prevent deterioration of touch sensitivity due to parasitic capacitance.

In contrast, without the touch buffer layer T-BUF, the touch sensor metal including the touch electrodes X-TE and Y-TE and the touch electrode connection lines X-CL and Y-CL can be disposed on the encapsulation layer ENCAP.

The touch buffer layer T-BUF can block or at least reduce penetration, into the organic material-containing light emitting layer EL, of external moisture or the chemical (e.g., developer or etchant) used while manufacturing the touch sensor metal disposed on the touch buffer layer T-BUF. Thus, the touch buffer layer T-BUF can prevent damage to the light emitting layer EL vulnerable to chemicals or moisture.

The touch buffer layer T-BUF can be formed of an organic insulation material with a low permittivity and formed at a low temperature which is not more than a predetermined temperature (e.g., 100° C.) to prevent or at least reduce damage to the light emitting layer EL containing the organic material vulnerable to high temperature. For example, the touch buffer layer T-BUF can be formed of an acrylic-based, epoxy-based, or siloxane-based material. The touch buffer layer T-BUF with planarizability, formed of an organic insulation material, can prevent fracture of the touch sensor metal formed on the touch buffer film T-BUF and damage to the internal layers PAS1, PCL, and PAS2 constituting the encapsulation layer ENCAP due to a warping of the OLED device.

In a mutual-capacitance-based touch sensor structure, the X-touch electrode line X-TEL and the Y-touch electrode line Y-TEL can be formed on the touch buffer layer T-BUF, and the X-touch electrode line X-TEL and the Y-touch electrode line Y-TEL can be disposed to cross each other. The Y-touch electrode line Y-TEL can include a plurality of Y-touch electrode connection lines Y-CL that electrically connect the plurality of Y-touch electrodes Y-TE.

In this situation, the plurality of Y-touch electrodes Y-TE and the plurality of Y-touch electrode connection lines Y-CL can be positioned on different layers, with the inter-layer dielectric ILD interposed therebetween.

The plurality of Y-touch electrodes Y-TE can be spaced apart at a predetermined interval along the y axis direction. The plurality of Y-touch electrodes Y-TE can be electrically connected with another Y-touch electrode Y-TE adjacent thereto in the y axis direction via the Y-touch electrode connection line Y-CL.

The Y-touch electrode connection line Y-CL can be formed on the touch buffer layer T-BUF and be exposed via the touch contact hole passing through the inter-layer dielectric ILD and be electrically connected with two Y-touch electrodes Y-TE adjacent in the y axis direction.

The Y-touch electrode connection line Y-CL can be disposed to overlap the bank BANK. Thus, it is possible to prevent or at least reduce a reduction in the aperture ratio due to the Y-touch electrode connection line Y-CL.

The X-touch electrode line X-TEL can include a plurality of X-touch electrode connection lines X-CL that electrically connect the plurality of X-touch electrodes X-TE. The plurality of X-touch electrodes X-TE and the plurality of X-touch electrode connection lines X-CL can be positioned on different layers, with the inter-layer dielectric ILD disposed therebetween.

The plurality of X-touch electrodes X-TE can be spaced apart at a predetermined interval along the x axis direction, on the inter-layer dielectric ILD. The plurality of X-touch electrodes X-TE can be electrically connected with another X-touch electrode X-TE adjacent thereto in the x axis direction via the X-touch electrode connection line X-CL.

The X-touch electrode connection line X-CL can be disposed on the same plane as the X-touch electrode X-TE and be electrically connected with two X-touch electrodes X-TE adjacent thereto in the x axis direction without a separate contact hole or be integrated with the two X-touch electrodes X-TE adjacent thereto each other in the x axis direction.

The X-touch electrode connection line X-CL can be disposed to overlap the bank BANK. Thus, it is possible to prevent a reduction in the aperture ratio due to the X-touch electrode connection line X-CL.

The Y-touch electrode line Y-TEL can be electrically connected with the touch driving circuit 150 via the Y-touch line Y-TL and the Y-touch pad Y-TP. Likewise, the X-touch electrode line X-TEL can be electrically connected with the touch driving circuit 150 via the X-touch line X-TL and the X-touch pad.

A pad cover electrode can be further provided to cover the X-touch pad and the Y-touch pad Y-TP.

The X-touch pad can be formed separately from the X-touch line X-TL or can extend from the X-touch line X-TL. The Y-touch pad Y-TP can be formed separately from the Y-touch line Y-TL or can extend from the Y-touch line Y-TL.

Where the X-touch pad extends from the X-touch line X-TL, and the Y-touch pad Y-TP extends from the Y-touch line Y-TL, the X-touch pad, the X-touch line X-TL, the Y-touch pad Y-TP, and the Y-touch line Y-TL can be formed of the same first conductive material. The first conductive material can be formed in a single-layer or multi-layer structure using a metal with good corrosion or acid resistance or electric conductivity, such as Al, Ti, Cu, or Mo.

For example, the X-touch pad, X-touch line X-TL, Y-touch pad Y-TP, and Y-touch line Y-TL formed of the first conductive material can be formed in a three-layer stacked structure, such as Ti/Al/Ti or Mo/Al/Mo.

The pad cover electrode capable of covering the X-touch pad and Y-touch pad Y-TP can be formed of a second conductive material which is the same material as the X-touch electrode and Y-touch electrode X-TE and Y-TE. The second conductive material can be formed of a transparent conductive material, such as ITO or IZO, which has high corrosion or acid resistance. The pad cover electrode can be formed to be exposed by the touch buffer layer T-BUF and be thus bonded with the touch driving circuit 150 or a circuit film where the touch driving circuit 150 is mounted.

The touch buffer layer T-BUF can be formed to cover the touch sensor metal, preventing or at least reducing corrosion to the touch sensor metal by external moisture. As an example, the touch buffer layer T-BUF can be formed of an organic insulation material or as a circular polarizer or epoxy or acrylic film. The touch buffer layer T-BUF on the encapsulation layer ENCAP can be omitted. In other words, the touch buffer layer T-BUF may not be an essential component.

The Y-touch line Y-TL can be electrically connected with the Y-touch electrode via the touch line contact hole or be integrated with the Y-touch electrode Y-TE.

The Y-touch line Y-TL can extend up to the non-display area and be electrically connected with the Y-touch pad Y-TP via the top and side of the encapsulation layer ENCAP and the top and side of the dam DAM. Thus, the Y-touch line Y-TL can be electrically connected with the touch driving circuit 150 via the Y-touch pad Y-TP.

The Y-touch line Y-TL can transfer the touch sensing signal from the Y-touch electrode Y-TE to the touch driving circuit 150 or can receive the touch driving signal from the touch driving circuit 150 and transfer the touch driving signal to the Y-touch electrode Y-TE.

In this situation, in the notch area NT and bending area BD, the Y-touch bridge line Y-BL connected through the contact hole CH can be disposed under the Y-touch line Y-TL. Since the Y-touch line Y-TL and the Y-touch bridge line Y-BL are electrically connected through at least one contact hole CH formed at regular intervals, the same touch driving signal or touch sensing signal can be transferred.

As such, when the Y-touch line Y-TL and the Y-touch bridge line Y-BL are electrically connected, the electrical resistance can be reduced during the transfer of the touch driving signal or the touch sensing signal. Further, when connecting the Y-touch line Y-TL and the Y-touch bridge line Y-BL through a plurality of contact holes CH, the touch signal (touch driving signal or touch sensing signal) can get around through the contact hole CH although a disconnection occurs in the Y-touch line Y-TL or Y-touch bridge line Y-BL in some section, so that the performance of touch sensing can be maintained.

The area other than the contact hole CH can be insulated by the inter-layer dielectric ILD disposed between the Y-touch line Y-TL and the Y-touch bridge line Y-BL.

A plurality of Y-touch lines Y-TL1, Y-TL2, Y-TL3, and Y-TL4 can be disposed in the bezel area BZ, and the Y-touch bridge electrode Y-BE having an integrated structure can be disposed thereunder.

The Y-touch bridge electrode Y-BE can have an integrated structure and be formed to have the same width or a larger width than the Y-touch lines Y-TL1, Y-TL2, Y-TL3, and Y-TL4 to be able to cover the area occupied by the Y-touch lines Y-TL1, Y-TL2, Y-TL3, and Y-TL4 positioned thereabove.

In this situation, the Y-touch bridge electrode Y-BE is connected to a ground voltage GND to discharge the noise charge introduced into the display panel 110 and is separated from the Y-touch bridge line Y-BL or the second node electrode NE2 positioned in the bending area BD.

Thus, the noise charge introduced to the display panel 110 can easily be discharged to the ground voltage GND by the Y-touch bridge electrode Y-BE formed in an integrated structure to be able to cover the area occupied by the Y-touch lines Y-TL1, Y-TL2, Y-TL3, and Y-TL4, so that the touch sensing performance of the touch display device 100 can be reduced, and defects during display driving can be reduced.

The X-touch line X-TL can be electrically connected with the X-touch electrode X-TE via the touch line contact hole or can be integrated with the X-touch electrode X-TE.

The X-touch line X-TL can extend up to the non-display area and be electrically connected with the X-touch pad via the top and side of the encapsulation layer ENCAP and the top and side of the dam DAM. Thus, the X-touch line X-TL can be electrically connected with the touch driving circuit 150 via the X-touch pad.

The X-touch line X-TL can receive the touch driving signal form the touch driving circuit 150 and transfer the touch driving signal to the X-touch electrode X-TE and can transfer the touch sensing signal from the X-touch electrode X-TE to the touch driving circuit 150.

Various changes can be made to the arrangement of the X-touch line X-TL and the Y-touch line Y-TL depending on the design of the display panel 110.

A touch protection film PAC can be disposed on the X-touch electrode X-TE and the Y-touch electrode Y-TE. The touch protection film PAC can extend up to before or after the dam DAM and can thus be disposed even on the X-touch line X-TL and the Y-touch line Y-TL.

Here, FIG. 5 illustrates a structure in which the touch electrodes X-TE and Y-TE are disposed on the encapsulation layer ENCAP as an example, but the touch electrodes X-TE and Y-TE can be located under the encapsulation layer ENCAP.

The cross-sectional views herein illustrate a conceptual structure of a touch display device 100. Depending on the direction or position in which it is viewed, the position, thickness, or width of each pattern (e.g., various layers or electrodes) can be varied, and the connection structure of various patterns can be varied, and an additional layer other than the layers shown can be present as well, or some of the layers can be omitted or combined. For example, the width of the bank BANK can be narrower than that shown in the drawings, and the height of the dam DAM can be higher or lower than shown.

For example, when the touch display device 100 according to embodiments of the disclosure is a liquid crystal display device, the plurality of touch electrodes TE can be disposed on the display panel 110 and be common electrodes to which a DC-level common voltage is applied for display driving.

Figure 6:
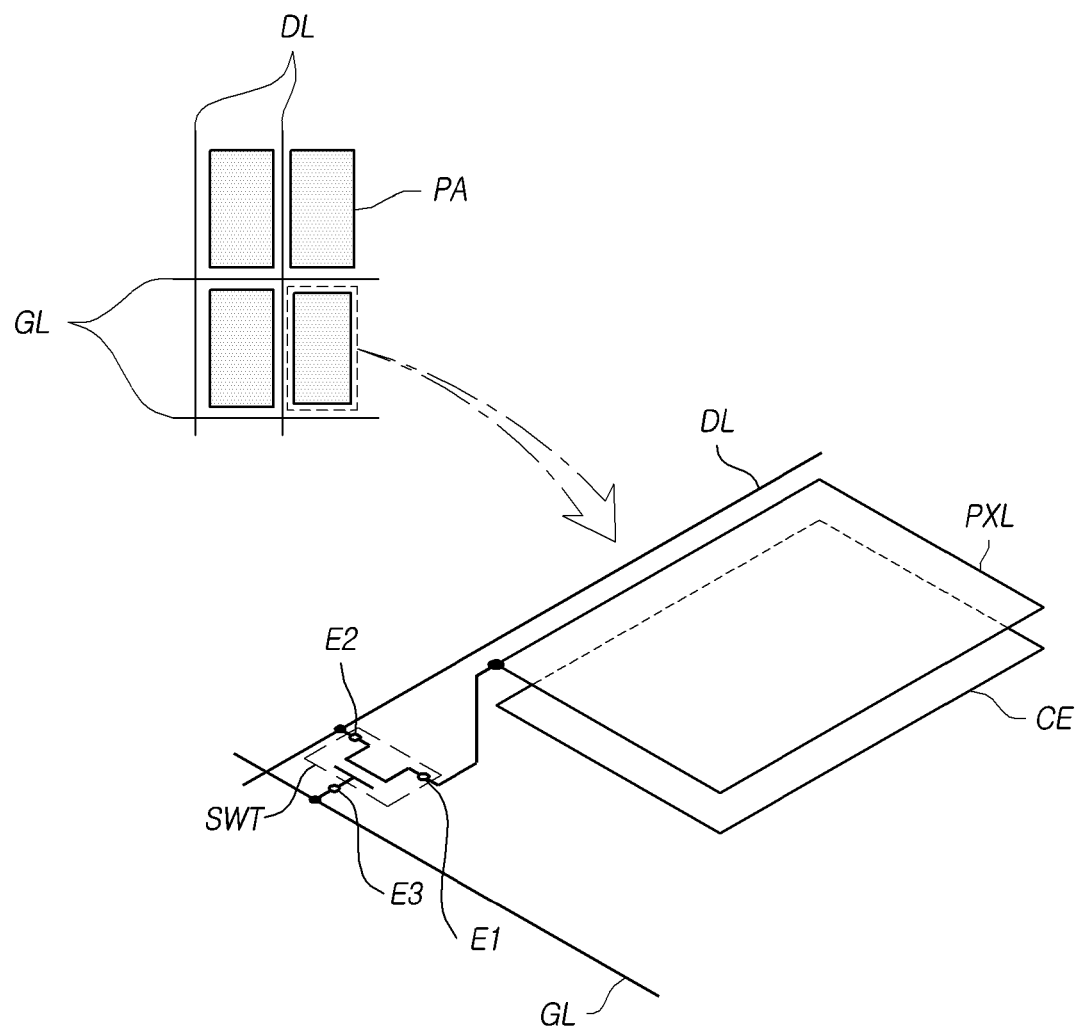
FIG. 6 is a diagram illustrating a touch sensing structure as an example when the touch display device according to embodiments of the present disclosure is a liquid crystal display device.
Figure 7:
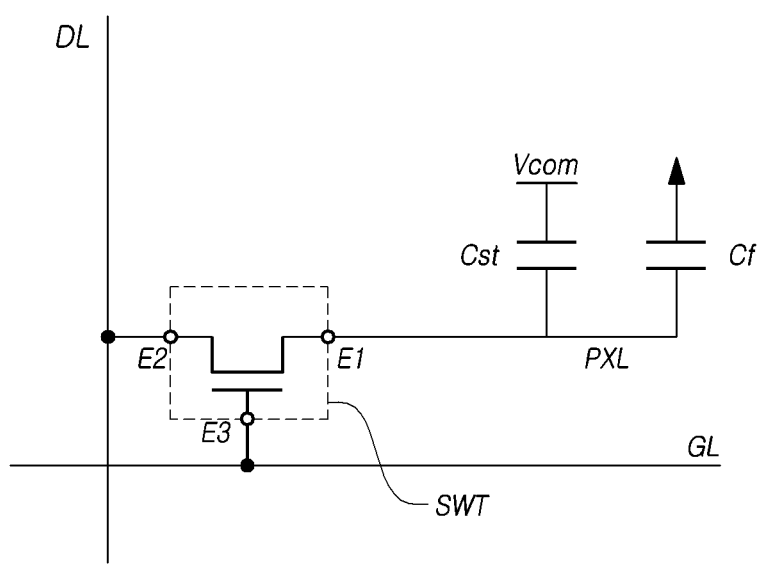
FIG. 7 is a diagram illustrating a touch sensing equivalent circuit as an example when the touch display device according to embodiments of the present disclosure is a liquid crystal display device.

FIG. 6 is a diagram illustrating a touch sensing structure as an example when the touch display device according to embodiments of the present disclosure is a liquid crystal display device. FIG. 7 is a diagram illustrating a touch sensing equivalent circuit as an example when the touch display device according to embodiments of the present disclosure is a liquid crystal display device.

Referring to FIGS. 6 and 7, the display panel 110 of the touch display device 100 according to embodiments of the present disclosure can have a touch sensing structure based on a pixel structure.

K number of data lines DL and H number of gate lines GL can be disposed and a plurality of pixels defined by the K number of data lines DL and the H number of gate lines GL can be arranged on the display panel 110 of the touch display device 100 according to embodiments of the present disclosure, where K and H are positive integers.

A pixel electrode PXL to which a data voltage corresponding to an image signal is applied can be disposed in each pixel area PA corresponding to each pixel.

In addition, in each pixel area PA, a switching transistor SWT whose on/off operation is controlled by a scan signal applied to a gate node through a corresponding gate line GL and which is electrically connected between the corresponding data line DL and the corresponding pixel electrode PXL can be disposed.

The switching transistor SWT transfers the data voltage from the data line DL to the pixel electrode PXL in a turn-on state.

The switching transistor SWT can include a first node E1 electrically connected to the pixel electrode PXL, a second node E2 electrically connected to the data line DL, a third node E3 electrically connected to the gate line GL, and a semiconductor layer with both ends in contact with the first node E1 and the second node E2.

The on/off operation of the switching transistor SWT can be controlled according to the scan signal applied to the third node E3 from the gate line GL.

In the switching transistor SWT, the first node E1 can be a drain node or a source node. The second node E2 can be a source node or a drain node. The third node E3 can be a gate node.

The switching transistor SWT can be an n-type transistor or a p-type transistor.

In embodiments of the present disclosure, the touch sensing structure can include a pixel electrode PXL, a common electrode CE, and a switching transistor SWT disposed in each pixel area PA.

In the touch sensing structure of the embodiments of the present disclosure, the pixel electrode PXL or the common electrode CE can serve as a touch sensor (e.g., during display driving, PXL and CE can be used for displaying an image, and during touch driving, PXL and CE can be used for sensing touch).

In addition, in the embodiments of the present disclosure, the touch sensing structure can be regarded as including a data line DL and a gate line GL.

Meanwhile, a DC level voltage Vcom can be applied to the common electrode CE of the display panel 110.

The common electrode CE and each pixel electrode PXL can serve as a storage capacitor Cst to maintain a voltage necessary for displaying an image for one frame. A capacitance stored in the storage capacitor Cst in each pixel can be determined by the DC voltage Vcom applied to the common electrode CE and the data voltage applied to each pixel electrode PXL.

Meanwhile, when a user touches the display panel 110, a finger capacitance Cf can be formed between a finger and the pixel electrode PXL. In this situation, the pixel electrode PXL serves as a touch electrode. On the other hand, the common electrode CE can serve as a touch electrode.

The finger capacitance Cf can be changed according to a location of a touched pixel.

Therefore, the touch display device 100 can detect an existence of a touch and the touch position through a difference in finger capacitance Cf.

In addition, the finger capacitance Cf can also be varied depending on a ridge which is protruded from a fingerprint of a finger and a valley which is concaved between ridges. Accordingly, the touch display device 100 can detect a difference in finger capacitance Cf and determine fingerprint information including patterns and shapes of the ridges and valleys of the fingerprint (e.g., for biometric authentication or fingerprint authentication).

Meanwhile, the DC voltage applied to the touch electrode TE can have a specific voltage level during the display driving period.

In this situation, the display panel 110 can be of a split type in which each of the plurality of touch electrodes TE is separated from another, or a woven type in which touch electrodes TE of different sizes are disposed in adjacent rows (or columns).

Figure 8:
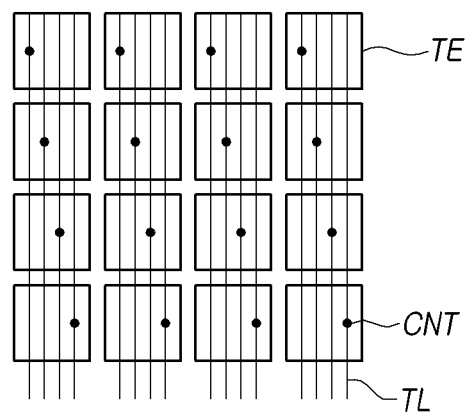
FIG. 8 is a view illustrating a display panel in which split-type touch electrodes are arranged in a touch display device according to embodiments of the disclosure.

FIG. 8 is a view illustrating a display panel in which split-type touch electrodes are arranged in a touch display device according to embodiments of the disclosure.

Referring to FIG. 8, in the situation of the display panel 110 having split-type touch electrodes TE of the same shape in the touch display device 100 according to embodiments of the disclosure, each of the plurality of touch electrodes TE can be electrically connected with the touch line TL where the touch driving signal or touch sensing signal is transferred through one or more contact holes CNT.

The plurality of touch electrodes TE can be positioned in the display area of the display panel 110. In some situations, some (e.g., the outermost touch electrodes) of the plurality of touch electrodes TE can be positioned in an area (outer area) outside of the display area or extend up to the area (outer area) outside of the display area. The display area can be an area where an image is displayed or an area where touch sensing is possible.

In this situation, the plurality of touch lines TL electrically connected to the plurality of touch electrodes TE can be positioned in the display area. In some situations, all or some the touch lines TL can be positioned outside of the display area. When the plurality of touch lines TL electrically connected to the plurality of touch electrodes TE are positioned in the display area, the plurality of touch lines TL can be positioned on a different layer than the plurality of touch electrodes TE and overlap the plurality of touch electrodes TE.

All of the plurality of touch lines TL can have the same or similar lengths and be disposed from points connected to the touch driving circuit 150 to the opposite points. Each of the plurality of touch lines TL can differ only in the position electrically connected to the corresponding touch electrode TE (e.g., the position of the contact hole CNT).

In the situation of the split-type display panel 110, if one touch electrode TE is electrically connected to one touch line TL, as many touch lines TL as the number of touch electrodes TE will be required. The number of touch lines TL corresponds to the number of touch channels for signal input/output of the touch driving circuit 150.

Accordingly, in the situation of a split type including 4×4 touch electrodes TE, 16 touch lines TL respectively connected to the 16 touch electrodes TE are disposed, so that at least 16 touch channels are required.

The touch display device 100 of the disclosure can be formed in a woven type in which touch electrodes TE of different sizes are disposed in adjacent rows or columns, rather than a split type in which each of the plurality of touch electrodes TE is separated from another.

Figure 9:
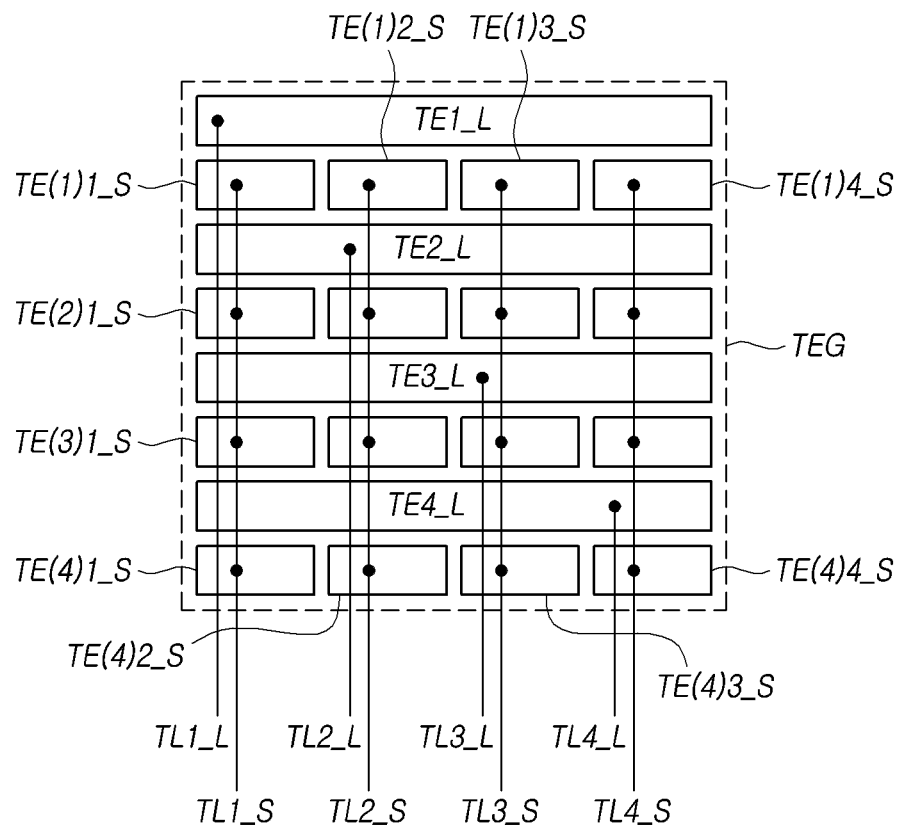
FIG. 9 is a view illustrating an example of a display panel in which woven-type touch electrodes are arranged in a touch display device according to embodiments of the disclosure.

FIG. 9 is a view illustrating an example of a display panel in which woven-type touch electrodes are arranged in a touch display device according to embodiments of the disclosure.

Referring to FIG. 9, in the touch display device 100 according to embodiments of the disclosure, the woven-type display panel 110 can include touch electrode groups TEG each including a plurality of (e.g., four) long touch electrodes TE1_L to TE4_L and a plurality of (e.g., four) short touch electrodes TE1_S to TE4_S connected in the same line.

In other words, the long touch electrodes TE1_L, TE2_L, TE3_L, and TE4_L elongated in the row direction can correspond to the length of the four short touch electrodes TE(1)1_S, TE(1)2_S, TE(1)3_S, and TE(1)4_S and, in this situation, the four short touch electrodes (e.g., TE(1)1_S, TE(2)1_S, TE(3)1_S, and TE(4)1_S) in the column direction can be connected to one short touch line (e.g., TL1_S). Accordingly, four short touch electrodes disposed in the column direction can be connected by one same line to constitute one short touch electrode block, and four long touch electrodes and four short touch electrode blocks corresponding thereto and connected by the same line can form one touch electrode group TEG.

In the situation of a woven-type 4×4 touch electrode structure, the number of touch electrodes in the row in which long touch electrode is disposed among two adjacent rows corresponds to ¼ of the number of touch electrodes in the row in which the short touch electrodes are disposed. Accordingly, the lengths of the long touch electrode TE1_L, TE2_L, TE3_L, and TE4_L are about four times the length of the short touch electrode TE1_S to TE4_S.

In this situation, the woven-type 4×4 touch electrode structure includes four long touch electrodes TE1_L, TE2_L, TE3_L, and TE4_L and 16 short touch electrodes TE(1)1_S, TE(1)2_S, TE(1)3_S, and TE(1)4_S to TE(4) 1_S, TE(4)2_S, TE(4)3_S, and TE(4)4_S), but the four short touch electrodes in the column direction (e.g., TE(1)1_S, TE(2)1_S, TE(3)1_S, and TE(4)1_S) are connected to one short touch line (e.g., TL1_S).

Therefore, as four short touch electrodes (e.g., TE(1)1_S, TE(2)1_S, TE(3)1_S, and TE(4)1_S) connected to the short touch line (e.g., TL1_S) form one short touch electrode block connected by the same line, 16 short touch electrodes TE(1)1_S, TE(1)2_S, TE(1)3_S, and TE(1)4_S to TE(4) 1_S, TE(4)2_S, TE(4)3_S, and TE(4)4_S constitute four short touch electrode blocks connected by the same line.

As a result, one long touch line TL1_L, TL2_L, TL3_L, and TL4_L is connected to the four long touch electrodes TE1_L, TE2_L, TE3_L, and TE4_L, and the short touch lines TL1_S, TL2_S, TL3_S, and TL4_S are connected one by one to the four short touch electrode blocks each connected by the same line. Thus, in the situation of the woven-type 4×4 touch electrode structure, eight touch lines TL1_L, TL2_L, TL3_L, TL4L, TL1_S, TL2_S, TL3_S, and TL4_S and 8 touch channels are required.

Therefore, as compared with the split-type touch electrode structure, the woven-type touch electrode structure can reduce the number of touch lines and the number of touch channels. This can improve image quality by reducing the amount of wiring above the subpixels.

Although the size of the touch electrode group TEG can be varied, the size of the touch electrode group TEG can be determined considering the distance from a finger or a stylus for multi-touch detection to efficiently arrange the touch electrodes TE on the display panel 110 and increase the accuracy of multi-touch detection.

A plurality of woven-type touch electrode groups TEG can be disposed on the display panel 110 in a horizontal direction and a vertical direction in which each touch electrode group TEG can be electrically separated in the display area where an image is displayed but can be connected to the touch driving circuit 150 through the touch line TL in the non-display area where no image is displayed.

Figure 10:
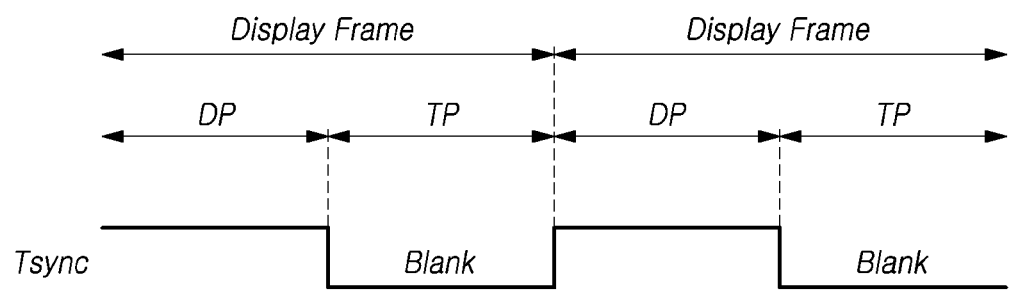
FIG. 10 is a timing diagram illustrating a display driving period and a touch driving period in a touch display device according to embodiments of the disclosure.

FIG. 10 is a timing diagram illustrating a display driving period and a touch driving period in a touch display device according to embodiments of the disclosure.

Referring to FIG. 10, the touch display device 100 according to embodiments of the disclosure can perform display driving for image display during a predetermined display driving period DP within one display frame period Display Frame and can perform touch driving for sensing a touch input by a finger or a stylus during a predetermined touch driving period TP within one display frame period Display Frame.

The touch display device 100 can share each electrode for pixel driving, as the electrode for touch detection. Accordingly, a DC voltage is supplied to the thin film transistor connected to the touch electrode during the display driving period DP, and a pulse-form touch driving signal is supplied to the touch electrode during the touch driving period TP.

The display driving period DP and the touch driving period TP can be temporally identical or overlap each other or be temporally separated periods.

When the display driving period DP and the touch driving period TP are temporally separated from each other, this situation can be referred to as time division driving.

When the display driving period DP and the touch driving period TP are temporally identical, display driving and touch driving can be performed simultaneously at the same time, and such a driving scheme can be referred to as time free driving.

In the situation of time division driving, the display driving period DP and the touch driving period TP can alternate.

As such, when the display driving period DP and the touch driving period TP are temporally separated while alternating, the touch driving period TP can correspond to a blank period when display driving is not performed.

The touch display device 100 can generate a touch synchronization signal Tsync swinging between a high level and a low level, thereby identifying or controlling the display driving period DP and the touch driving period TP. In other words, the touch synchronization signal Tsync can be a timing control signal defining the touch driving period TP.

For example, a high-level period (or a low-level period) of the touch synchronization signal Tsync can correspond to the display driving period DP, and the low-level period (or high-level period) of the touch synchronization signal Tsync can correspond to the touch driving period TP.

In this situation, the touch driving circuit 150 can apply the touch driving signal to the touch electrode TE during the touch driving period TP in which the touch synchronization signal Tsync is at the low level and can sense the presence or absence of a touch and the touch position of the passive stylus or the active stylus using the touch sensing signal received from the touch electrode TE.

In relation to the scheme of allocating the display driving period DP and the touch driving period TP within one display frame period Display Frame, one display frame period Display Frame can be divided into one display driving period DP and one touch driving period TP, and display driving can be performed during the display driving period DP and touch driving for sensing the touch input by the passive stylus and the active stylus can be performed during the touch driving period TP.

In other words, the touch display device 100 can perform driving for a touch once during the display frame period Display Frame which is one period of the frame frequency or the screen change period (refresh rate) of the display panel 110.

For example, when the frame frequency is 60 Hz, display driving of turning on or off the pixels through N gate lines constituting the display panel 110 within a period of 1/60s is performed, and then, the touch driving period TP for touch sensing proceeds for a predetermined interval. In this situation, the touch detection frequency (touch report rate) will be 60 Hz. Of course, other frame frequencies can be used as well, such as 120 Hz or 240 Hz, etc.

As another example, one display frame period Display Frame can be divided into two or more display driving periods DP and two or more touch driving periods TP. Display driving can be performed during two or more display driving periods DP within one display frame period Display Frame, and touch driving for sensing one or two or more touch inputs by the passive stylus and the active stylus in the whole or part of the screen can be performed during two or more touch driving periods TP.

As such, when one display frame period Display Frame is divided into two or more display driving periods DP and two or more touch driving periods TP, and display driving and touch driving are performed, each of two or more blank periods Blank corresponding to two or more touch driving periods TP within one display frame period Display Frame is referred to as a long horizontal blank (LHB).

Accordingly, two or more periods when touch sensing of a stylus or a finger is performed within the display frame period Display Frame can be referred to as an LHB or touch driving period TP, and touch driving performed during two or more LHBs within one display frame period Display Frame can be referred to as "LHB driving."

Figure 11:
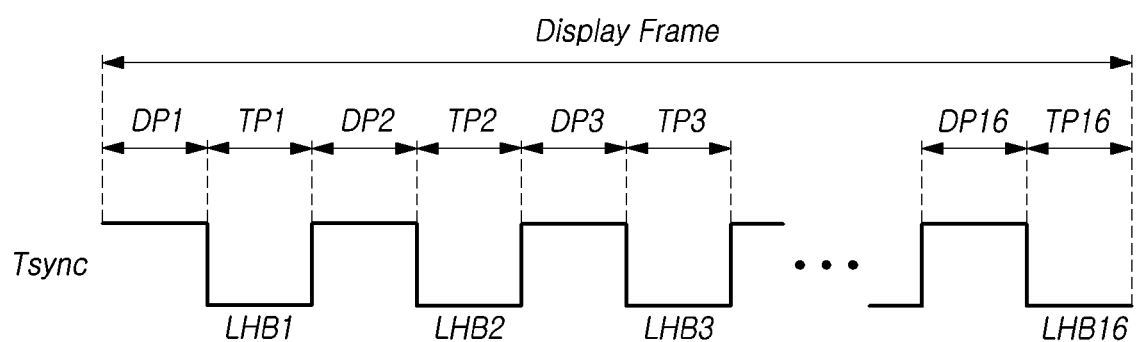
FIG. 11 is an example long horizontal blank (LHB) driving timing diagram in a touch display device according to embodiments of the disclosure.

FIG. 11 is an example LHB driving timing diagram in a touch display device according to embodiments of the disclosure.

Referring to FIG. 11, in the touch display device 100 according to embodiments of the disclosure, one display frame period Display Frame can be time-divided into 16 display driving periods DP1 to DP16 and 16 touch driving periods TP1 to TP16.

In this situation, the 16 touch driving periods (e.g., TP1 to TP16) can correspond to 16 LHBs (e.g., LHB1 to LHB16).

In this situation, the touch display device 100 can divide one display frame period Display Frame into one or more display driving periods DP1 to DP16 and one or more touch driving periods TP1 to TP16 to alternately perform a display driving operation and a touch driving operation.

Alternatively, the touch driving period TP1 to TP16 can proceed independently from the display driving period DP1 to DP16.

Figure 12:
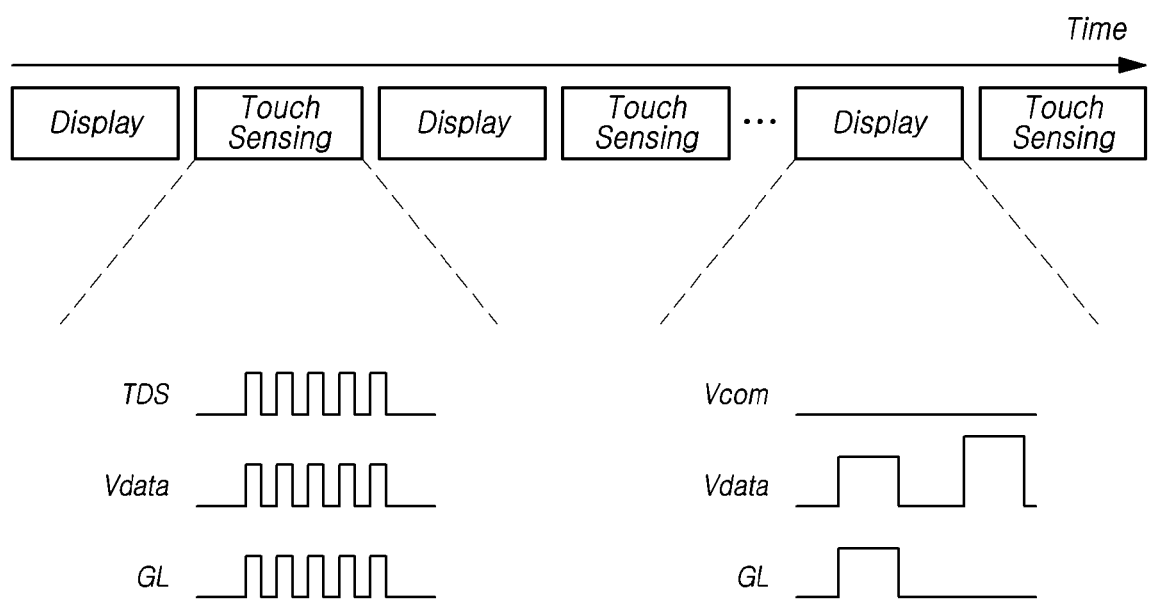
FIG. 12 is a signal timing diagram in a situation in which the touch display device according to embodiments of the present disclosure operates by dividing a time into a display driving period and a touch driving period by time division.

FIG. 12 is a signal timing diagram in a situation in which the touch display device according to embodiments of the present disclosure operates by dividing a time into a display driving period and a touch driving period by time division.

Referring to FIG. 12, the touch display device according to embodiments of the present disclosure can include touch driving periods for performing touch sensing operation by driving the touch electrodes of the display panel 110 in blank periods between display driving periods.

For example, the touch display device can perform the touch sensing operation during vertical blank periods respectively in a single image frame or during some horizontal periods among a plurality of horizontal periods in a single image frame.

In a situation in which the common electrodes CE of the display panel 110 are used as the touch electrodes, the DC voltage Vcom can be applied to the touch electrodes TE through the touch lines TL connected to the touch electrodes in the display driving periods, and the touch driving signal TDS can be applied to the touch electrodes TE through the touch lines TL connected to the touch electrodes TE in the touch driving periods. The touch driving signal TDS can be a pulse signal, the voltage magnitude of which changes over time.

Since the display driving process is not performed during the touch driving periods, the electrodes or signal lines for the display driving operation may have no voltages applied thereto or can be in a constant-voltage state. Accordingly, some parasitic capacitance may be generated among the touch electrodes TE to which the touch driving signal TDS is applied, the gate lines GL, the data lines DL, and the like, and the performance of the touch sensing signal may be degraded by the parasitic capacitance.

To prevent the parasitic capacitance from generated among the touch electrodes TE, the gate lines GL, the data lines DL, and the like, a signal corresponding to the touch driving signal TDS applied to the touch electrodes TE can also be supplied to the gate lines GL, the data lines DL, and the like during the touch driving period (e.g., a type of load-free driving signal can be applied to the other lines different than the touch electrodes TE).

For example, during the touch driving period in which the touch sensing operation is performed, the data voltage Vdata with amplitude and phase of which are the same as those of the touch driving signal TDS can be supplied to the data lines DL. Here, since the gate lines GL are in a state in which a gate low voltage VGL has been applied thereto, an alternating signal with the amplitude and phase of which are the same as those of the touch driving signal TDS can be supplied to a line, to which the gate low voltage VGL is applied, during the touch sensing period, so that a signal, the amplitude and phase of which are the same as those of the touch driving signal TDS, can be supplied to the gate lines GL.

As described above, due to the supply of the alternating signal with the amplitude and phase of which are the same as those of the touch driving signal TDS to the gate lines GL, the data lines DL during touch driving periods, and the like, parasitic capacitance between the touch electrodes TE and the touch lines TL can be prevented, thereby improving the ability to detect the touch sensing signal.

In addition, during the display driving period in which the display driving operation is performed, the data voltage Vdata having a specific level can be applied to corresponding subpixels for displaying an image.

Figure 13:
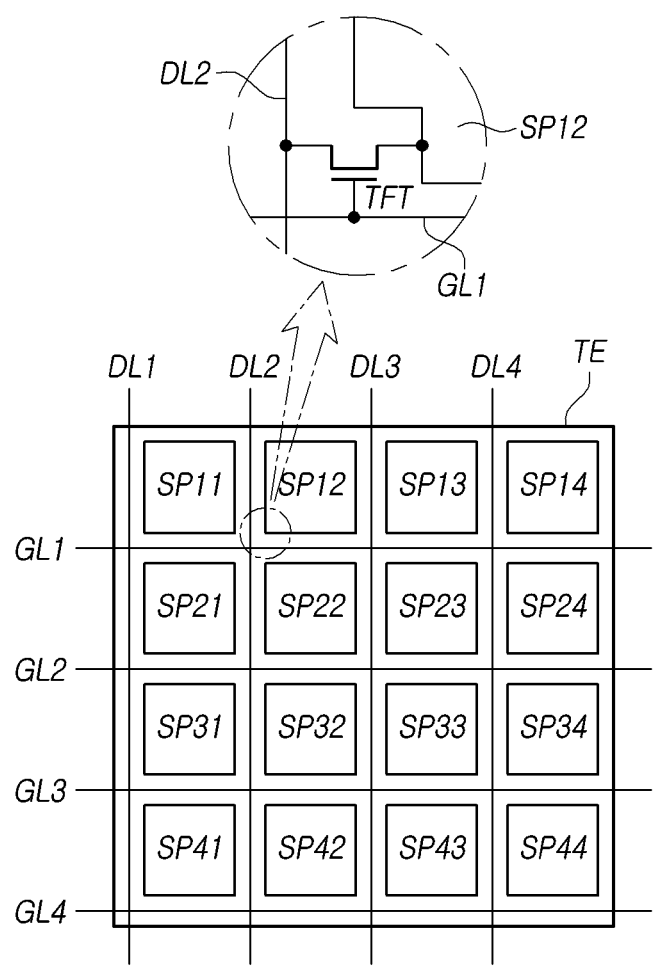
FIG. 13 is a view illustrating a portion of a touch electrode area in a touch display device according to embodiments of the disclosure.

FIG. 13 is a view illustrating a portion of a touch electrode area in a touch display device according to embodiments of the disclosure.

Referring to FIG. 13, the touch display device 100 according to embodiments of the disclosure can include thin film transistors TFT formed on a substrate, subpixel electrodes SP11 to SP44 connected to the drain nodes or source nodes of the thin film transistors, and a touch electrode TE formed to overlap the subpixel to form an electric field.

The gate node of the thin film transistor TFT is connected to the gate line, and is controlled for on/off operation according to the scan signal, and the source node or drain node is connected to the data line DL to which the data voltage is supplied.

In this situation, when a passive stylus, such as a finger, or an active stylus touches the display panel 110, the touch display device 100 recognizes a change in the capacitance of the touch electrode TE close to the contact position of the stylus to detect the position of the touch.

In other words, the position of the touch can be detected by detecting the capacitance change in each of the touch electrodes TE by applying the touch driving signal to the touch electrode TE formed on the display panel 110 and then detecting the touch sensing signal received from the touch electrodes TE.

In this situation, a DC voltage or a touch signal is applied to the touch electrode TE of the touch display device 100, and a parasitic capacitance coupled to the touch electrode TE can be created. For example, a parasitic capacitance can be created between the gate line and the touch electrode TE by the scan signal applied to the display panel 110 through the gate line. The parasitic capacitance can increase the load on the touch electrode TE, causing a distortion in the DC voltage supplied to the touch electrode TE and a defective line on the display panel 110.

Figure 14:
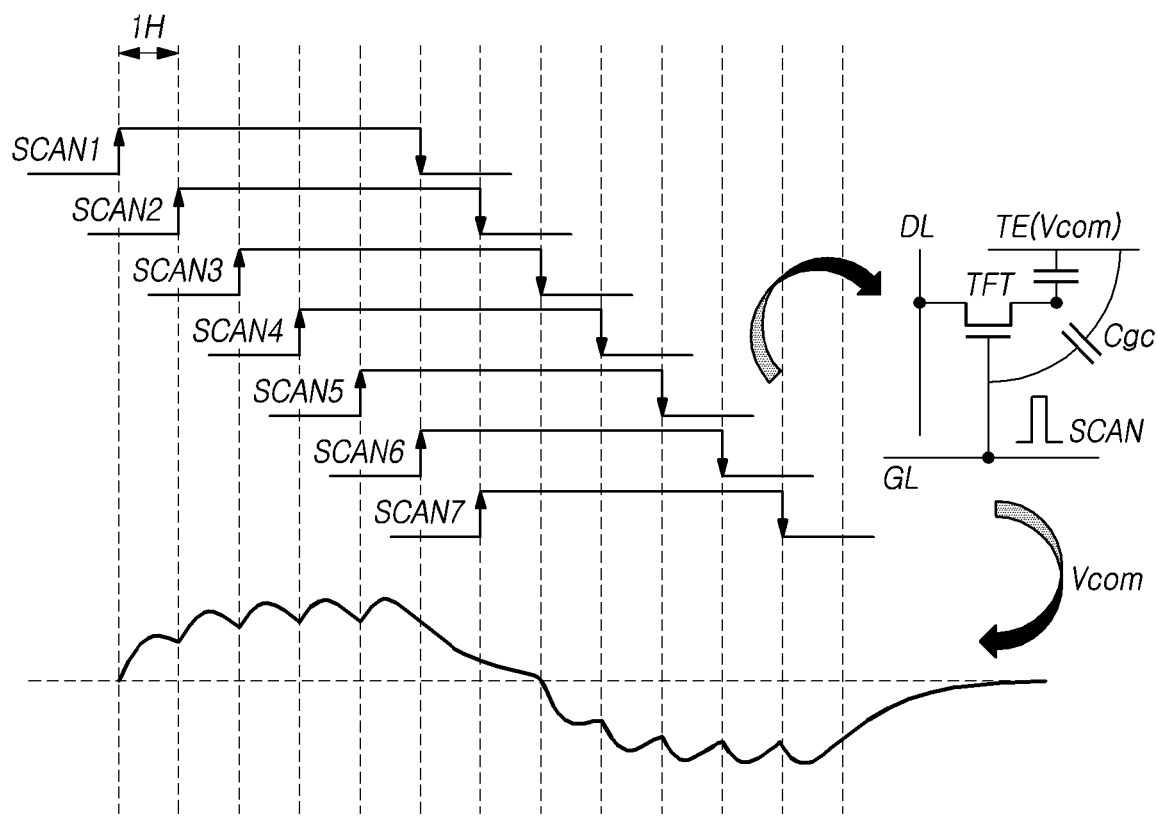
FIG. 14 is a conceptual view illustrating an overlap distortion caused by a load deviation in touch electrode during a display driving period and an overlap of scan signals in a touch display device according to embodiments of the disclosure.

FIG. 14 is a conceptual view illustrating an overlap distortion caused by a load deviation in a touch electrode during a display driving period and an overlap of scan signals in a touch display device according to embodiments of the disclosure.

Referring to FIG. 14, in the touch display device 100 according to embodiments of the disclosure, the scan signals SCAN supplied to the display panel 110 through the gate line can be sequentially transmitted at intervals of one horizontal period 1H.

In this situation, the scan signal SCAN can maintain a high level for a predetermined period. In the illustrated example, the scan signal SCAN has a high level period of 5 horizontal periods 5H, but embodiments are not limited thereto.

As such, when the scan signal SCAN supplied to the display panel 110 through the gate line GL has a predetermined high level period and is supplied at intervals of one horizontal period 1H, a period when adjacent scan signals SCAN overlap each other occurs. A parasitic capacitance Cgc can be created between the gate line GL and the touch electrode TE due to the overlapping periods of the scan signals SCAN.

In other words, the parasitic capacitance Cgc accumulates between the gate node of the thin film transistor TFT and the touch electrode TE to which the DC voltage Vcom is applied, causing an increase in the load on the touch electrode TE and resultantly distorting the DC voltage Vcom (e.g., a distortion builds up on the common electrode Vcom).

For example, when the scan signal SCAN has a high level period of 5 horizontal periods 5H, the scan signal SCAN having a period of 1 horizontal period 1H can be overlapped up to 5 times. Thus, the time in which the parasitic capacitance Cgc accumulates can also be a maximum of 5 horizontal periods 5H. As such, in a period in which the overlapping number of the scan signals SCAN increases, a rising distortion of the DC voltage Vcom occurs.

On the other hand, falling distortion of the DC voltage Vcom occurs in a period in which the overlapping number of the scan signals SCAN decreases. At this time, the decrease of the DC voltage Vcom appears relatively larger than the rise. Therefore, since the charging time for the corresponding subpixel SP is not sufficient during the falling distortion period of the DC voltage Vcom, image defects can appear such as horizontal lines appearing from the falling distortion point of the DC voltage Vcom at which the overlapping number of the scan signal SCAN decreases.

For example, since the distortion of the DC voltage Vcom can be proportional to the overlapping number of scan signals SCAN corresponding to the touch electrode TE, the DC compensation voltage for compensating for the distortion of the DC voltage Vcom can vary according to the overlapping number of scan signals SCAN. For example, if there is a large number of overlapping scan signals SCAN corresponding to the touch electrode TE, then a large DC compensation voltage can be applied for compensating for the distortion of the DC voltage Vcom. Conversely, if there is a small number of overlapping scan signals SCAN corresponding to the touch electrode TE, then a small DC compensation voltage can be applied for compensating for the distortion of the DC voltage Vcom.

Also, the distortion of the DC voltage Vcom can vary depending on the shape of the touch electrode TE to which the touch signal is supplied.

In particular, the parasitic capacitance Cgc formed between the touch electrodes TE by the scan signal SCAN increases as the position of the gate line GL is located closer to the touch electrode TE. Thus, the distortion of DC voltage Vcom can increase.

The size of the touch electrode TE disposed on the display panel 110 can correspond to the size of the area of one subpixel and can correspond to the size of the area of two or more subpixels. Each touch electrode TE can be of a plate type having no opening or a mesh type having one or more openings.

When one touch electrode TE is of the mesh type and has a size corresponding to the size of the area of two or more subpixels, one touch electrode TE can have two or more openings, and the position and size of each of the two or more openings can correspond to the position and size of the emission area of the subpixel.

Figure 15:
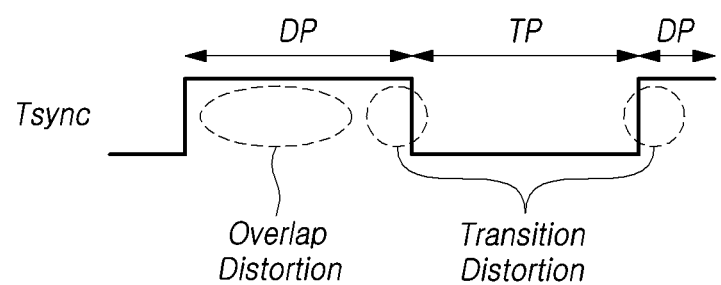
FIG. 15 is a view illustrating a type of a DC voltage distortion caused between a gate line and a touch electrode in a touch display device according to embodiments of the disclosure.
Figure 16:
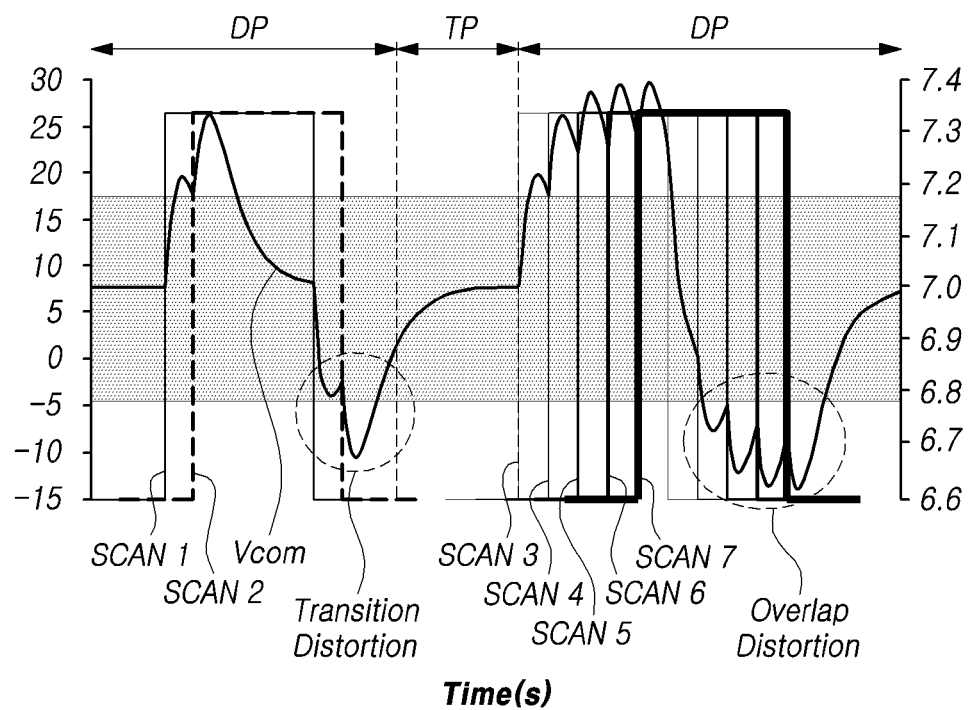
FIG. 16 is a signal waveform diagram illustrating a DC voltage distortion.

FIG. 15 is a view illustrating a type of a DC voltage distortion caused between a gate line and a touch electrode in a touch display device according to embodiments of the disclosure, and FIG. 16 is a signal waveform diagram illustrating a DC voltage distortion.

Referring to FIGS. 15 and 16, the touch display device 100 according to embodiments of the disclosure can perform display driving for image display during a predetermined display driving period DP within one display frame period and can perform touch driving for sensing a touch input by a finger or a stylus during a predetermined touch driving period TP.

In this situation, the touch electrode TE for touch detection can be used as an electrode for driving each pixel. Accordingly, a DC voltage is supplied to the touch electrode TE during the display driving period DP, and a pulse-form touch driving signal is supplied to the touch electrode TE during the touch driving period TP.

In this situation, when transitioning from the display driving period DP to the touch driving period TP, the gate driving circuit 120 does not generate scan signals SCAN. And then, at the time when the display driving period DP has started after the touch driving period TP has terminated, the gate driving circuit 120 generates scan signals SCAN again.

As such, even in a transition period in which the gate driving circuit 120 operates discontinuously, the DC voltage Vcom can still be distorted by the overlap of the scan signals SCAN and the operation change of the gate driving circuit 120 on some gate lines GL. As a result, defects such as the appearance of faint horizontal lines may occur due to a luminance deviation in an area corresponding to an area corresponding to a period in which the display driving period DP and the touch driving period TP are switched, which may be visible to a user and impair image quality.

In particular, when the scan signals SCAN overlap with each other in a transition period in which the display driving period DP and the touch driving period TP are changed, the effect due to the overlap of the scan signals SCAN and the operation change of the gate driving circuit 120 can be duplicated. Accordingly, in the transition period, the distortion of the DC voltage Vcom can be amplified due to the overlap of the scan signals SCAN and the operation changes of the gate driving circuit 120.

Here, FIGS. 15 and 16 illustrate a situation in which distortion of the DC voltage Vcom occurs as an example due to a decrease of the overlapping number of the scan signals SCAN in the transition period immediately before the first scan signal SCAN1 and the second scan signal SCAN2 enter into the touch driving period TP from the display driving period DP.

As described above, a defect occurring during the transition process in which the display driving period DP and the touch driving period TP are changed can be referred to as transition distortion.

Further, the scan signals SCAN supplied through the gate line GL during the display driving period DP can overlap with each other during a display driving period DP, so that the parasitic capacitance formed between the gate node of the thin film transistor and the touch electrode can be accumulated. In the illustrated example, a distortion of the DC voltage Vcom occurs during the display driving period DP due to an overlap between the third scan signals SCAN3 to the seventh scan signal SCAN7.

Such parasitic capacitance can increase the load on the touch electrode, causing distortion of the DC voltage and hence image defects, such as the appearance of faint horizontal lines, due to differences in luminance. As described above, a defect caused by the overlap between scan signals SCAN within the display driving period DP can be referred to as overlap distortion.

Such overlap distortion can occur in the display driving period DP but, in the situation of time free driving in which display driving and touch driving are performed simultaneously, the overlap distortion can also occur in the touch driving period TP because a scan signal is supplied during the touch driving period TP. However, since a DC-level DC voltage is applied during the display driving period DP, and a pulse-type touch driving signal is applied during the touch driving period TP, the form of the distortion of the DC voltage can be varied.

Figure 17:
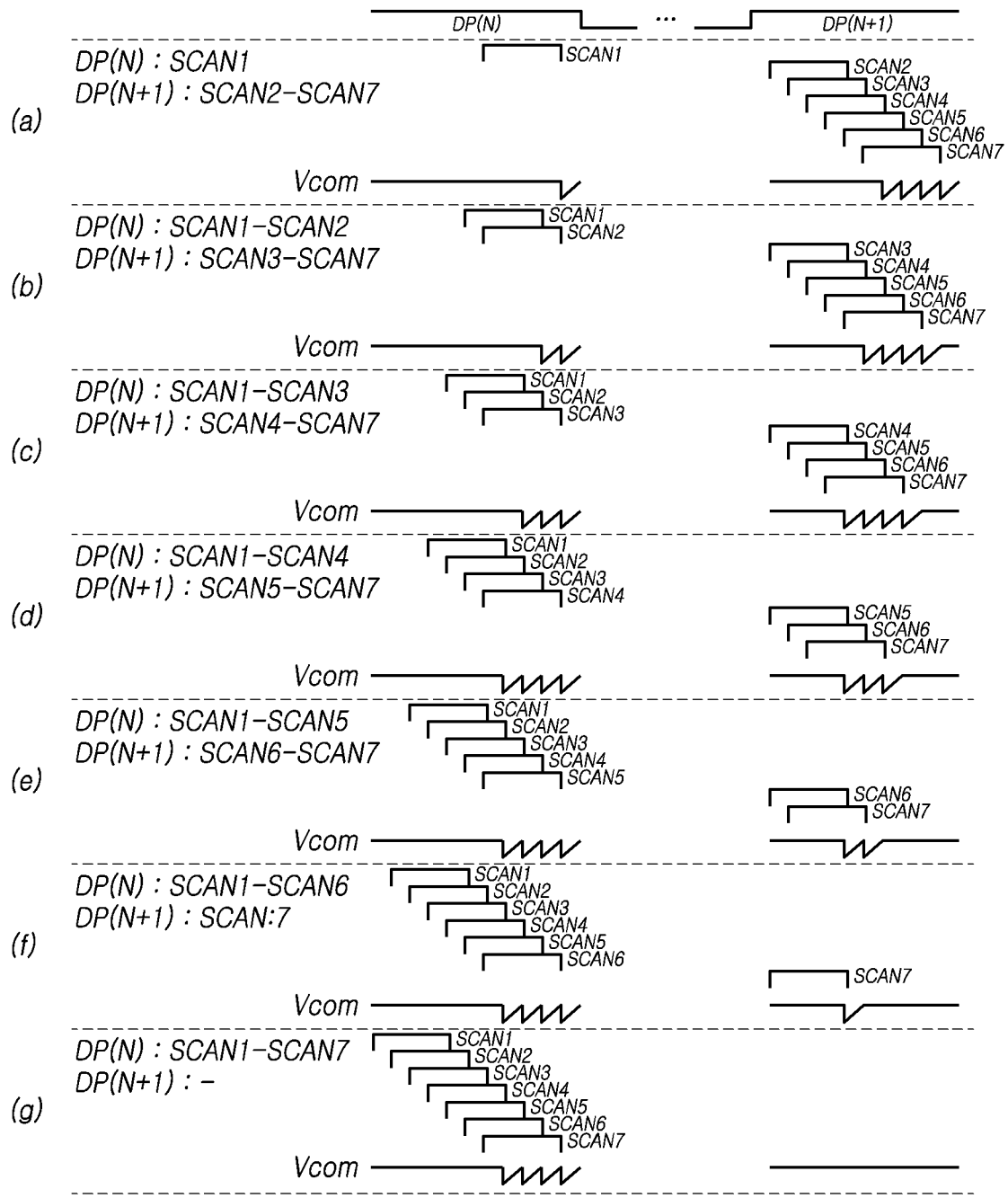
FIG. 17, including parts (a)-(g), is a diagram illustrating transition distortion according to an overlapping number of scan signals in a transition process between a display driving period and a touch driving period in a display device according to embodiments of the disclosure as an example.

FIG. 17 is a diagram illustrating transition distortion according to an overlapping number of scan signals in a transition process switching between a display driving period and a touch driving period in a display device according to embodiments of the disclosure as an example.

Referring to FIG. 17, in the display device 100 according to embodiments of the disclosure, the size of the transition distortion can vary depending on the number of overlaps between scan signals SCAN in the period when the display driving period DP and the touch driving period TP transition with respect to adjacent display driving periods DP(N) and DP(N+1).

For example, when seven gate lines GL1 to GL7 correspond to one touch electrode TE and seven scan signals SCAN1 to SCAN 7 are supplied through the seven gate lines GL1 to GL7, the seven scan signals SCAN1 to SCAN7 applied to the seven gate lines GL1 to GL7 can be divided and applied in the Nth display driving period DP(N) and the N+1th display driving period DP(N+1).

For example, as shown in part (a) of FIG. 17, the first scan signal SCAN1 can be applied through the first gate line GL1 in the Nth display driving period DP(N), and the second scan signal SCAN2 to the seventh scan signal SCAN7 can be applied through the second gate line GL2 to the seventh gate line GL7 during the N+1th display driving period DP(N+1).

In this situation, only the first scan signal SCAN1 exists in the Nth display driving period DP(N), but in the N+1th display driving period DP(N+1), the second scan signal SCAN2 to the seventh scan signal SCAN7 can overlap each other at predetermined time intervals (e.g., six scan signals overlap).

Accordingly, in the Nth display driving period DP(N), the transition distortion of the DC voltage Vcom is small and returns to normal rather quickly, but in the N+1th display driving period DP(N+1), the transition distortion of the DC voltage Vcom is large and takes a longer amount of time to return back to the normal level for DC voltage Vcom.

Accordingly, in this situation, the first DC compensation voltage having a high level can be applied during the N+1th display driving period DP(N+1), and the second DC compensation voltage having a low level can be applied in the Nth display driving period DP(N). In other words, a small amount of compensation can be applied to the DC voltage Vcom during the Nth display driving period DP(N), and a large amount of compensation can be applied to the DC voltage Vcom during the N+1th display driving period DP(N+1).

Further, as shown in part (b) of FIG. 17, in the Nth display driving period DP(N), the first scan signal SCAN1 and the second scan signal SCAN2 can be applied through the first gate line GL1 and the second gate line GL2, and the third scan signal SCAN3 to the seventh scan signal SCAN7 can be applied through the third gate line GL3 to the seventh gate line GL7 during the N+1th display driving period DP(N+1).

In this situation, in the Nth display driving period DP(N), the first scan signal SCAN1 and the second scan signal SCAN2 can overlap each other at predetermined time intervals (e.g., two overlapping scan signals), and in the N+1th display driving period DP(N+1), the third scan signal SCAN3 to the seventh scan signal SCAN7 can overlap each other at predetermined time intervals (e.g., five overlapping scan signals).

Accordingly, in the Nth display driving period DP(N), the transition distortion of the DC voltage Vcom is still small since there are only two overlapping scan signals, but in the N+1th display driving period DP(N+1), the transition distortion of the DC voltage Vcom is large due to the noise or load generated from the five overlapping scan signals.

Accordingly, in this situation, the first DC compensation voltage having a high level can be applied during the N+1th display driving period DP(N+1) when the number of overlaps between scan signals SCAN is large, and the second DC compensation voltage having a low level can be applied in the Nth display driving period DP(N) when the number of overlaps between scan signals SCAN is small.

Further, as shown in part (c) of FIG. 17, in the Nth display driving period DP(N), the first scan signal SCAN1 to the third scan signal SCAN3 can be applied through the first gate line GL1 to the third gate line GL3 and, in the N+1th display driving period DP(N+1), the fourth scan signal SCAN4 to the seventh scan signal SCAN7 can be applied through the fourth gate line GL4 to the seventh gate line GL7.

In this situation, in the Nth display driving period DP(N), the first scan signal SCAN1 to the third scan signal SCAN3 can overlap each other at predetermined time intervals (e.g., three overlapping scan signals in DP(N)) and, in the N+1th display driving period DP(N+1), the fourth scan signal SCAN4 to the seventh scan signal SCAN7 can overlap each other at predetermined time intervals (e.g., four overlapping scan signals in DP(N+1)).

Accordingly, in the Nth display driving period DP(N), the transition distortion of the DC voltage Vcom is still relatively small, but in the N+1th display driving period DP(N+1), the transition distortion of the DC voltage Vcom is large.

Accordingly, in this situation, the first DC compensation voltage having a high level can be applied during the N+1th display driving period DP(N+1) when the number of overlaps between scan signals SCAN is large, and the second DC compensation voltage having a low level can be applied in the Nth display driving period DP(N) when the number of overlaps between scan signals SCAN is small.

Further, as shown in part (d) of FIG. 17, in the Nth display driving period DP(N), the first scan signal SCAN1 to the fourth scan signal SCAN4 can be applied through the first gate line GL1 to the fourth gate line GL4 and, in the N+1th display driving period DP(N+1), the fifth scan signal SCAN5 to the seventh scan signal SCAN7 can be applied through the fifth gate line GL5 to the seventh gate line GL7.

In this situation, in the Nth display driving period DP(N), the first scan signal SCAN1 to the fourth scan signal SCAN4 can overlap each other at predetermined time intervals (e.g., four overlapping scan signals in DP(N)) and, in the N+1th display driving period DP(N+1), the fifth scan signal SCAN5 to the seventh scan signal SCAN7 can overlap each other at predetermined time intervals (e.g., three overlapping scan signals in DP(N+1)).

Accordingly, in the Nth display driving period DP(N), the transition distortion of the DC voltage Vcom now becomes large, but in the N+1th display driving period DP(N+1), the transition distortion of the DC voltage Vcom is small.

Accordingly, in this situation, the first DC compensation voltage having a high level can be applied during the Nth display driving period DP(N) when the number of overlaps between scan signals SCAN is large, and the second DC compensation voltage having a low level can be applied in the N+1th display driving period DP(N+1) when the number of overlaps between scan signals SCAN is small.

Further, as shown in part (e) of FIG. 17, in the Nth display driving period DP(N), the first scan signal SCAN1 to the fifth scan signal SCAN5 can be applied through the first gate line GL1 to the fifth gate line GL5 and, in the N+1th display driving period DP(N+1), the sixth scan signal SCAN6 and the seventh scan signal SCAN7 can be applied through the sixth gate line GL6 and the seventh gate line GL7.

In this situation, in the Nth display driving period DP(N), the first scan signal SCAN1 to the fifth scan signal SCAN5 can overlap each other at predetermined time intervals (e.g., five overlapping scan signals in DP(N)) and, in the N+1th display driving period DP(N+1), the sixth scan signal SCAN6 and the seventh scan signal SCAN7 can overlap each other at predetermined time intervals (e.g., two overlapping scan signals in DP(N+1)).

Accordingly, in the Nth display driving period DP(N), the transition distortion of the DC voltage Vcom is large, but in the N+1th display driving period DP(N+1), the transition distortion of the DC voltage Vcom is small.

Accordingly, in this situation, the first DC compensation voltage having a high level can be applied during the Nth display driving period DP(N) when the number of overlaps between scan signals SCAN is large, and the second DC compensation voltage having a low level can be applied in the N+1th display driving period DP(N+1) when the number of overlaps between scan signals SCAN is small.

Further, as shown in part (f) of FIG. 17, in the Nth display driving period DP(N), the first scan signal SCAN1 to the sixth scan signal SCAN6 can be applied through the first gate line GL1 to the sixth gate line GL6 and, in the N+1th display driving period DP(N+1), the seventh scan signal SCAN7 can be applied through the seventh gate line GL7.

In this situation, in the Nth display driving period DP(N), the first scan signal SCAN1 to the sixth scan signal SCAN6 overlap each other at predetermined time intervals (e.g., six overlapping scan signals in DP(N)) and, in the N+1th display driving period DP(N+1), only the seventh scan signal SCAN7 exists (e.g., one scan signal in DP(N+1)).

Accordingly, in the Nth display driving period DP(N), the transition distortion of the DC voltage Vcom is large, but in the N+1th display driving period DP(N+1), the transition distortion of the DC voltage Vcom is small.

Accordingly, in this situation, the first DC compensation voltage having a high level can be applied during the Nth display driving period DP(N) when the number of overlaps between scan signals SCAN is large, and the second DC compensation voltage having a low level can be applied in the N+1th display driving period DP(N+1) when the number of overlaps between scan signals SCAN is small.

Further, as shown in part (g) of FIG. 17, in the Nth display driving period DP(N), the first scan signal SCAN1 to the seventh scan signals SCAN7 can be applied through the first gate line GL1 to the seventh gate line GL7 and, in the N+1th display driving period DP(N+1), no scan signal SCAN can be applied.

In this situation, in the Nth display driving period DP(N), the first scan signal SCAN1 to the seventh scan signal SCAN7 can overlap at predetermined time intervals (e.g., seven overlapping scan signals in DP(N)) and, in the N+1th display driving period DP(N+1), no scan signal SCAN exists (e.g., no scan signal in DP(N+1)).

Accordingly, in the Nth display driving period DP(N), the transition distortion of the DC voltage Vcom is large, but in the N+1th display driving period DP(N+1), the transition distortion of the DC voltage Vcom is not even small rather there is no distortion of the DC voltage Vcom.

Accordingly, in this situation, the first DC compensation voltage having a high level can be applied in the Nth display driving period DP(N) when the number of overlaps between scan signals SCAN is large, and the DC voltage Vcom may not need any compensation in the in the N+1th display driving period DP(N+1) and it can be left unaltered.

As described above, when the scan signals SCAN overlap in the transition period in which the gate driving circuit 120 operates discontinuously, the effect of the overlap of the scan signals SCAN can be duplicated on the effect of changes in the operation of the gate driving circuit 120. Therefore, even if the overlapping number of the scan signals SCAN in the display driving period DP is the same in the transition period, the level of the DC compensation voltage applied in the transition period can be higher than the level of the DC compensation voltage applied in the display driving period DP. For example, the level of the DC compensation voltage applied during each display driving period DP can be changed based on how many overlapping scan signals are present.

In the touch display device 100 of the disclosure, the level of the DC compensation voltage for compensating for the transition distortion occurring during a transition between the display driving period DP and the touch driving period TP can be determined considering the shape of the touch electrode TE corresponding to the gate line GL where the scan signal SCAN is supplied in the transition period.

FIG. 18, including parts (a) and (b), show views illustrating an example of a shape of a touch electrode corresponding to a position of a gate line in a touch display device according to embodiments of the disclosure.

Referring to FIG. 18, in the touch display device 100 according to embodiments of the present disclosure, long touch electrodes TE_L, which are longer in a horizontal direction, and short touch electrodes TE_S, which are relatively shorter than the long touch electrodes TE_L in the horizontal direction, can be arranged in a woven-type of configuration.

As such, in a situation where there are the touch electrodes TE that have different sizes as shown in part (a) of FIG. 18, when the first gate line GL1 to the seventh gate line GL7 are disposed in positions corresponding to the long touch electrodes TE_L, the transition distortion due to the first scan signal SCAN1 to the seventh scan signal SCAN7 applied through the first gate line GL1 to the seventh gate line GL7 is significantly increased due to the large load or large amount of noise induced in the long touch electrode TE_L.

In contrast, when the eighth gate line GL8 to the fourteenth gate line GL14 are disposed in positions corresponding to the short touch electrodes TE_S as shown in part (b) of FIG. 18B, the transition distortion due to the eighth scan signal SCAN8 to the fourteenth scan signal SCAN14 applied through the eighth gate line GL8 to the fourteenth gate line GL14 can be relatively small in comparison, due to the small load or the small among of noise induced in the short touch electrodes TE_S.

Accordingly, to compensate for transition distortion occurring during the transition process between the display driving period DP and the touch driving period TP, the first DC compensation voltage having a high level can be selectively applied in the period when the scan signal SCAN is applied to the gate line GL corresponding to the long touch electrode TE_L, and the second DC compensation voltage having a low level can be selectively applied in the period when the scan signal SCAN is applied to the gate line GL corresponding to the short touch electrode TE_S. In other words, a different amount of compensation can be applied to the DC voltage Vcom based on whether the activated scan lines overlap with a large touch electrode or overlap with small touch electrodes. For example, a high compensation level can be applied when the activated scan lines overlap with a large touch electrode and a small compensation level can be applied when the activated scan lines overlap with small touch electrodes.

At this time, it is preferable that the DC compensation voltage for compensating for the distortion of the DC voltage Vcom is selectively generated or dynamically adjusted to correspond to different conditions during the distortion period of the DC voltage Vcom.

The distortion period of the DC voltage Vcom displaying the image defect of the horizontal line appears from a falling distortion point of the DC voltage Vcom when the overlapping number of the scan signals SCAN decreases. Therefore, it is preferable to generate a DC compensation voltage for the DC voltage Vcom when the overlapping number of the scan signals SCAN decreases and terminate the DC compensation voltage when the overlapping of the scan signals SCAN ends. Thus, only applying DC compensation voltage when it is actually needed, in order to provide a finer granularity of control.

Figure 19:
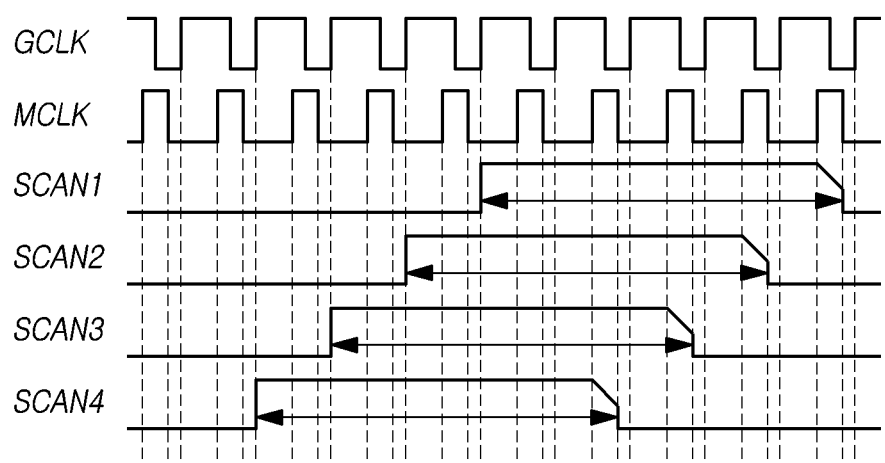
FIG. 19 is a diagram illustrating an example of generating scan signals in a touch display device according to embodiments of the disclosure.

FIG. 19 is a diagram illustrating an example of generating scan signals in a touch display device according to embodiments of the disclosure.

Referring to FIG. 19, the timing controller 140 of the touch display device 100 according to embodiments of the disclosure can generate scan signals SCAN using a gate clock signal GCLK designating the turn-on timing operation of the scan signals SCAN and a main clock signal MCLK designating the turn-off timing operation of the scan signals SCAN. For example, a rising edge of the gate clock signal GCLK can control a rising edge of the scan signal SCAN, and a rising edge of the main clock signal MCLK can control a start of a falling edge of the scan signal SCAN and a falling edge of the main clock signal MCLK can correspond to when the scan signal SCAN terminates, but embodiments are not limited thereto.

The gate clock signal GCLK is composed of pulses having the same amplitude and shifted at regular intervals, and can determine the turn-on timing operation of the scan signals SCAN applied to each gate line GL.

For example, the scan signal SCAN applied to the corresponding gate line GL transitions to a turn-on level at a rising time of the gate clock signal GCLK corresponding to each gate line GL.

The main clock signal MCLK is composed of pulses having the same amplitude and shifted at regular intervals, and can determine the turn-off timing operation of the scan signals SCAN applied to each gate line GL.

Therefore, the scan signal SCAN applied to each gate line GL is turned on at the rising time of the gate clock signal GCLK, and is turned off at the falling time of the main clock signal MCLK to the turn-off level.

At this time, since the gate clock signal GCLK and the main clock signal MCLK have the same amplitude and are shifted at regular intervals, the scan signals SCAN generated based on them can be shifted at regular intervals with the same amplitude.

As the scan signals SCAN generated by the gate clock signal GCLK and the main clock signal MCLK corresponding to each gate line GL are sequentially applied to each gate line GL, the subpixels SP connected to each gate line GL are sequentially driven.

Meanwhile, the DC voltage Vcom can be distorted by overlapping the scan signals SCAN during the display driving period DP or the transition period of the touch synchronization signal Tsync. The distortion period of the DC voltage Vcom with the image defect of a noticeable horizontal line may appear from the falling distortion timing of DC voltage when the overlapping number of the scan signals SCAN decreases.

Therefore, the touch display device 100 of the present disclosure compensates for the distortion of the DC voltage Vcom by determining the DC compensation period from the rising time of the scan signals SCAN when the overlapping number of the scan signals SCAN decreases to the falling time of the scan signals SCAN when the overlap of the scan signals SCAN ends.

For the sake of above, the rising time of the gate clock signal GCLK designating the rising time of the scan signals SCAN, can be selected as the starting point for providing the DC compensation voltage, and the falling time of the main clock signal MCLK designating the falling time of the scan signals SCAN can be selected as the ending point for when to stop supplying the DC compensation voltage. In this way, the DC compensation voltage can be applied only when needed, at an accurate and selective timing, in order to prevent the occurrence of a faint horizontal line image defect from appearing on the screen, thus improving image quality and conserving power consumption.

Figure 20:
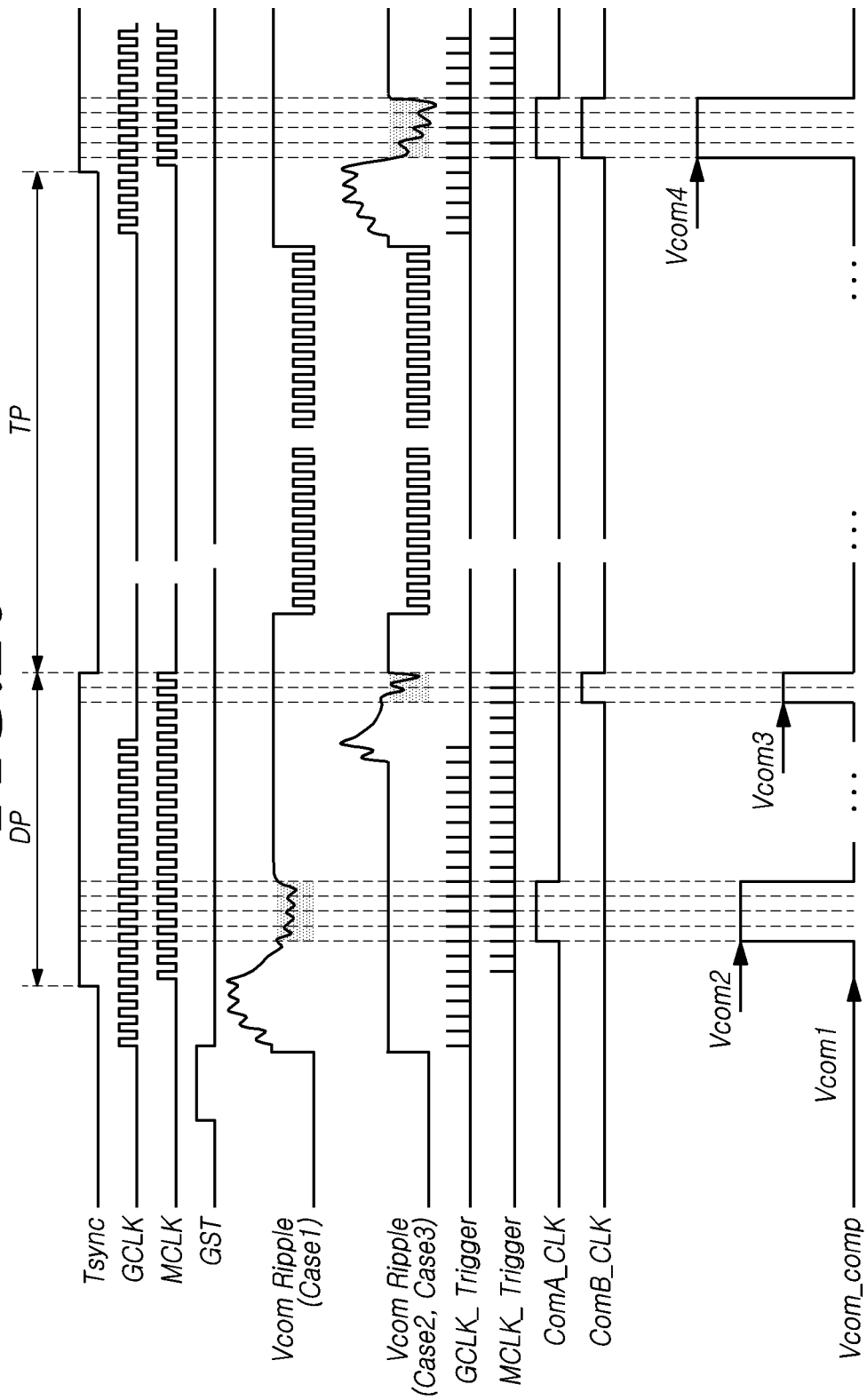
FIG. 20 is a signal flowchart illustrating a process of generating a DC compensation voltage in a touch display device according to embodiments of the disclosure.

FIG. 20 is a signal flowchart illustrating a process of generating a DC compensation voltage in a touch display device according to embodiments of the disclosure.

Referring to FIG. 20, the touch display device 100 according to embodiments of the disclosure can distinguish a display driving period DP and a touch driving period TP based on a touch synchronization signal Tsync.

The gate clock signal GCLK is commonly applied to one or more gate driving integrated circuits GDIC from the timing controller 140, and can control the shift timing of the scan signals SCAN.

The main clock signal MCLK can be applied to the timing controller 140 from an external host system. The main clock signal MCLK is composed of shifted pulses at regular interval with the same amplitude, and can determine the turn-off timing of the scan signals SCAN applied to each gate line GL.

The gate start pulse GST can determine the start point of the operation of the gate driving circuit 120.

The first DC voltage Vcom1 corresponding to the reference DC voltage can be applied during a period in which distortion of the DC voltage Vcom does not occur.

As described above, the distortion of the DC voltage Vcom can occur in a period in which a plurality of scan signals SCAN applied through a plurality of gate lines GL are overlap each other or in a period in which the touch synchronization signal Tsync transitions.

Here, a situation in which overlapping distortion of DC voltage occurs due to overlapping scan signals SCAN during the display driving period DP is referred to as a first case (Case 1), a situation in which transition distortion of the DC voltage occurs due to the discontinuous operation of the gate driving circuit 120 in a transition period of the touch synchronization signal Tsync is referred to as a second case (Case 2), and a situation in which the overlapping distortion and the transition distortion occur together due to overlapped scan signals SCAN in the transition period of the touch synchronization signal Tsync is referred to as a third case (Case 3).

The horizontal line image defect due to the overlapping distortion of the DC voltage Vcom appears from the time of the falling distortion of the DC voltage Vcom when the overlapping number of scan signals SCAN decreases. Accordingly, a time at which the scan signals SCAN rise in a period in which the overlapping number of the scan signals SCAN decreases can be determined as a start time for when to apply the DC compensation voltage Vcom_comp. In addition, a time at which the scan signals SCAN fall in a period in which the overlap of the scan signals SCAN ends can be determined as an end time for when to stop applying the DC compensation voltage Vcom_comp.

For above purpose, the rising time of the gate clock signal GCLK which determines the rising time of the scan signals SCAN can be selected as a starting time for applying the DC compensation voltage Vcom_comp, and the falling time of the main clock signal MCLK which determines the falling time of the scan signals SCAN can be selected as the end time for when to stop applying the DC compensation voltage Vcom_comp.

For above the purpose, a gate clock trigger signal GCLK_Trigger can be generated by detecting rising edges of the gate clock signal GCLK, and a main clock trigger signal MCLK_Trigger can be generated by detecting falling edges of the main clock signal MCLK.

The touch display device 100 of the present disclosure can generate a DC compensation voltage Vcom_comp using a first DC compensation clock ComA_CLK corresponding to the overlapping distortion of the DC voltage Vcom and a second DC compensation clock ComB_CLK corresponding to the transition distortion of the DC voltage Vcom.

The first DC compensation clock ComA_CLK corresponding to the overlapping distortion of the DC voltage Vcom can be generated using the gate clock trigger signal GCLK_Trigger corresponding to the rising edges of the gate clock signal GCLK and the main clock trigger signal MCLK_Trigger corresponding to the falling edges of the main clock signal MCLK.

Accordingly, the first DC compensation clock ComA_CLK can be determined by the gate clock trigger signal GCLK_Trigger and the main clock trigger signal MCLK_Trigger corresponding to the overlapping period of the scan signals SCAN.

Accordingly, a second DC voltage Vcom2 capable of compensating for the overlapping distortion of the DC voltage Vcom can be applied as the DC compensation voltage Vcom_comp in a period when the first DC compensation clock ComA_CLK has the turn-on level.

On the other hand, the second DC compensation clock ComB_CLK corresponding to the transition distortion of the DC voltage Vcom can be generated in the transition period in which the display driving period DP is changed to the touch driving period TP or when the touch driving period TP is changed to the display driving period DP.

At this time, the second DC compensation clock ComB_CLK can be determined based on the rising time of the gate clock signal GCLK designating the rising time of the scan signals SCAN and the falling time of the main clock signal MCLK designating the falling time of the scan signals SCAN.

Accordingly, a third DC voltage Vcom3 capable of compensating for the transition distortion of the DC voltage Vcom can be applied as the DC compensation voltage Vcom_comp in a period when the second DC compensation clock ComB_CLK has the turn-on level.

In addition, when the scan signals SCAN are overlapped with each other in a transition period in which the display driving period DP is changed with the touch driving period TP, the overlapping distortion due to the overlap of the scan signals SCAN and the transition distortion due to a change in the operation of the gate driving circuit 120 can be duplicated.

In this situation, a period in which the first DC compensation clock ComA_CLK is applied at the turn-on level can be duplicated to a period in which the second DC compensation clock ComB_CLK is applied at the turn-on level (e.g., when both ComA_CLK and ComB_CLK have the turn-on level). As a result, the fourth DC voltage Vcom4 which reflects both of the second DC voltage Vcom2 capable of compensating for the overlapping distortion of the DC voltage Vcom and the third DC voltage Vcom3 capable of compensating for the transition distortion of the DC voltage Vcom can be applied as the DC compensation voltage Vcom_comp (e.g., Vcom2+Vcom3=Vcom4).

Figure 21:
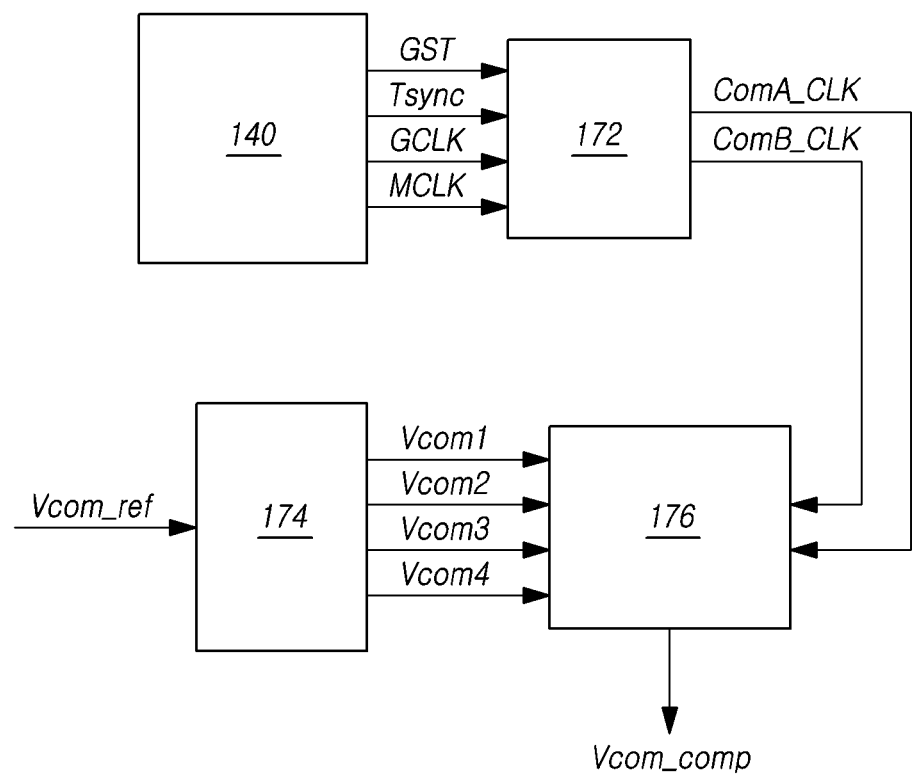
FIG. 21 is a diagram illustrating a system configuration for generating a DC compensation voltage in a touch display device according to embodiments of the disclosure as an example

FIG. 21 is a diagram illustrating a system configuration for generating a DC compensation voltage in a touch display device according to embodiments of the disclosure as an example.

Referring to FIG. 21, the touch display device 100 according to embodiments of the disclosure can include a timing controller 140 for transmitting a gate clock signal GCLK and a main clock signal MCLK, a compensation clock generating circuit 172 for generating DC compensation clocks ComA_CLK and ComB_CLK using the gate clock signal GCLK and the main clock signal MCLK, a DC voltage generating circuit 174 for generating a plurality of DC voltages Vcom1, Vcom2, Vcom3, and Vcom4, and a DC compensation voltage generating circuit 176 for generating a DC compensation voltage Vcom_comp.

The timing controller 140 can supply a gate start pulse GST, a touch synchronization signal Tsync, a gate clock signal GCLK, and a main clock signal MCLK to the compensation clock generating circuit 172.

The compensation clock generating circuit 172 can include an edge detecting circuit for generating a gate clock trigger signal GCLK_Trigger by detecting rising edges of the gate clock signal GCLK, and for generating a main clock trigger signal MCLK_Trigger by detecting falling edges of the main clock signal MCLK. In addition, the compensation clock generating circuit 172 can generate a first DC compensation clock ComA_CLK and a second DC compensation clock ComB_CLK corresponding to overlapping distortion or transition distortion of the DC voltage Vcom by using the gate clock trigger signal GCLK_Trigger and the main clock trigger signal MCLK_Trigger.

The first DC compensation clock ComA_CLK can be a signal corresponding to the overlapping distortion of the DC voltage Vcom caused by overlap of the scan signals SCAN, and the second DC compensation clock ComB_CLK can be a signal corresponding to the transition distortion of the DC voltage Vcom caused in a transition period of touch synchronization signal Tsync (e.g., when Tsync transitions from low to high, or from high to low, which designates when to switch between the display mode and the touch mode). When the scan signals SCAN overlap with each other in the transition period of the touch synchronization signal Tsync, the first DC compensation clock ComA_CLK and the second DC compensation clock ComB_CLK can be applied together (e.g., both ComA_CLK and ComB_CLK are high at the same time).

The DC voltage generating circuit 174 can generate a plurality of DC voltages Vcom1, Vcom2, Vcom3, and Vcom4 by using a reference DC voltage Vcom_ref applied from the power management circuit. Here, the first DC voltage Vcom1 corresponds to the reference DC voltage Vcom_ref, and the second DC voltage Vcom2, the third DC voltage Vcom3, and the fourth DC voltage Vcom4 can be DC voltage having a different level from the reference DC voltage Vcom_ref.

Also, the second DC voltage Vcom2 can have a level for compensating the overlapping distortion of the DC voltage Vcom caused by overlapping scan signals SCAN.

The third DC voltage Vcom3 can correspond to a level to compensate for transition distortion of the DC voltage Vcom caused in the transition period of the touch synchronization signal Tsync.

The fourth DC voltage Vcom4 can correspond to a level to compensate for a distortion when the scan signals SCAN overlap with each other in the transition period of the touch synchronization signal Tsync.

The DC compensation voltage generating circuit 176 can include a multiplexer MUX for generating a DC compensation voltage Vcom_comp by selecting from among a plurality of DC voltages Vcom1, Vcom2, Vcom3, and Vcom4 according to the first DC compensation clock ComA_CLK and the second DC compensation clock ComB_CLK.

The compensation clock generating circuit 172, the DC voltage generating circuit 174, and the DC compensation voltage generating circuit 176 can be located within the power management circuit 160 or can be located within the touch driving circuit 150, but embodiments are not limited thereto.

Figure 22:
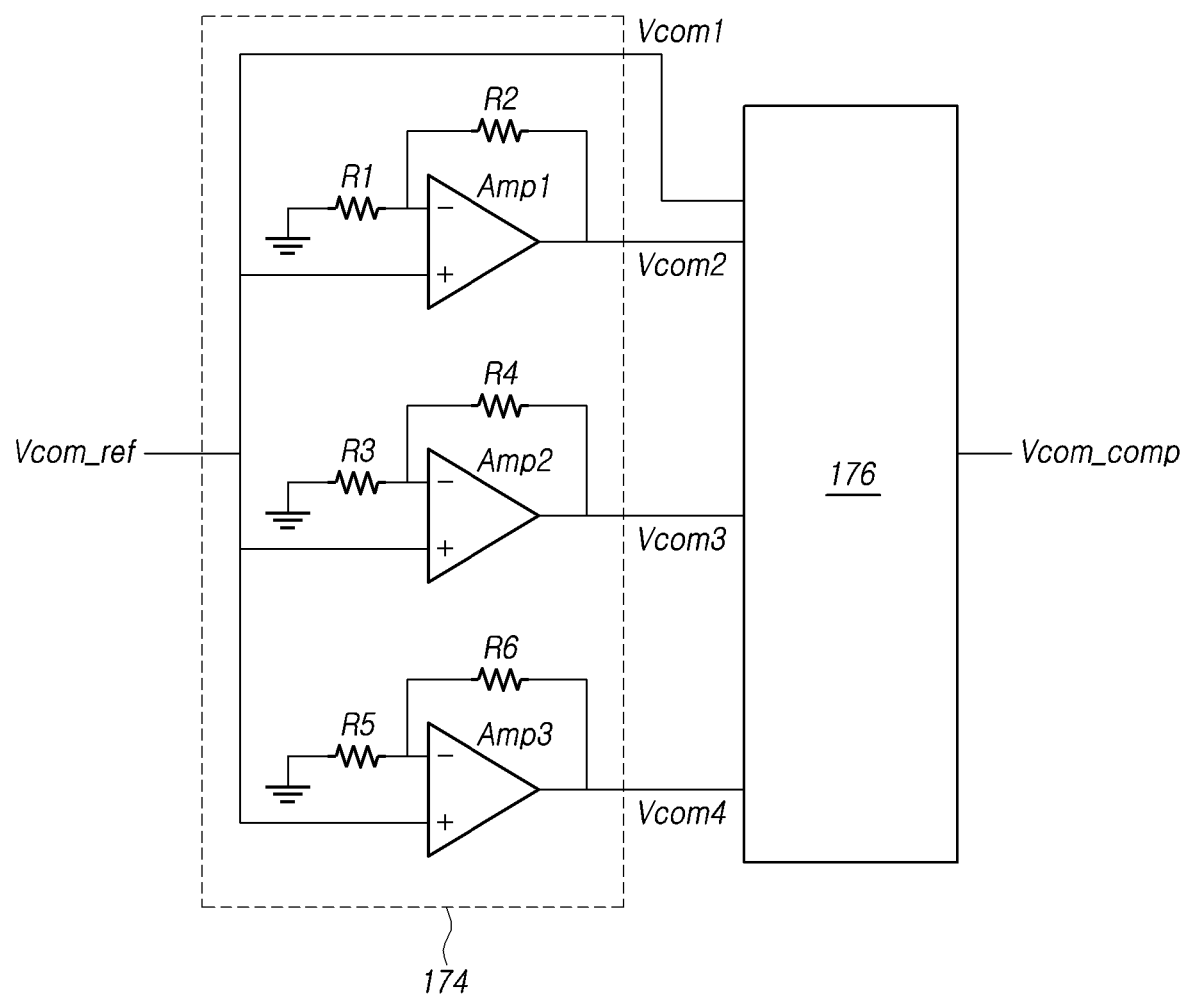
FIG. 22 is a diagram illustrating an example of a DC voltage generating circuit in a touch display device according to embodiments of the disclosure.

FIG. 22 is a diagram illustrating an example of a DC voltage generating circuit in a touch display device according to embodiments of the disclosure.

Referring to FIG. 22, in the touch display device 100 according to embodiments of the disclosure, the DC voltage generating circuit 174 can include a first amplifier Amp1 for generating the second DC voltage Vcom2 by using the reference DC voltage Vcom_ref, a second amplifier Amp2 for generating a third DC voltage Vcom3 by using the reference DC voltage Vcom_ref, and a third amplifier Amp3 for generating a fourth DC voltage Vcom4 by using the reference DC voltage Vcom_ref According to another embodiment, the fourth DC voltage Vcom4 can be generated by summing the output from the first amplifier Amp1 and the output from the second amplifier Amp2.

The reference DC voltage Vcom_ref can have a level that varies according to a temperature of the display panel 110. For example, the reference DC voltage Vcom_ref can have a level of the first reference DC voltage when an operating temperature of the display panel 110 is within a reference temperature range. On the other hand, when the operating temperature of the display panel 110 is outside of the reference temperature range, the reference DC voltage Vcom_ref can have a level of the second reference DC voltage different from the first reference DC voltage.

The DC voltage generating circuit 174 can transfer the reference DC voltage Vcom_ref as the first DC voltage Vcom1.

The first amplifier Amp1 receives the reference DC voltage Vcom_ref through a non-inverting input terminal, and generates a second DC voltage Vcom2 having a different level than the reference DC voltage Vcom_ref by a first resistor R1 and a second resistor R2 connected to the inverting input terminal.

The second amplifier Amp2 receives the reference DC voltage Vcom_ref through a non-inverting input terminal, and generates a third DC voltage Vcom3 having a different level than the reference DC voltage Vcom_ref by a third resistor R3 and a fourth resistor R4 connected to the inverting input terminal.

The third amplifier Amp3 receives the reference DC voltage Vcom_ref through a non-inverting input terminal, and generates a fourth DC voltage Vcom4 having a different level than the reference DC voltage Vcom_ref by a fifth resistor R5 and a sixth resistor R6 connected to the inverting input terminal.

For example, each the first amplifier Amp1, the second amplifier Amp2, and the third amplifier Amp3 can generate DC voltages with different levels by resistors connected to the inverting input terminals.

FIG. 23 is a block diagram illustrating an example of a circuit of generating a DC compensation voltage in a touch display device according to embodiments of the disclosure.

Referring to FIG. 23, in the touch display device 100 according to embodiments of the disclosure, the compensation voltage generating circuit 176 for generating the DC compensation voltage Vcom_comp can include a multiplexer MUX, which has a first DC voltage Vcom1, a second DC voltage Vcom2, a third DC voltage Vcom3, and a fourth DC voltage Vcom4 as inputs and whose output signal can be selected by a first DC compensation clock ComA_CLK and a second DC compensation clock ComB_CLK.

The first DC voltage Vcom1 can have the same level as the reference DC voltage Vcom_ref.

The second DC voltage Vcom2 is a voltage to be applied when overlapping distortion occurs when the scan signals SCAN overlap with each other during the display driving period DP, and can have a higher level than the first DC voltage Vcom1. The level of the second DC voltage Vcom2 can be determined according to the overlapping number of the scan signals SCAN in the display driving period DP. For example, the level of the second DC voltage Vcom2 can be changed or can be set based on how many scan signals SCAN overlap with each other (e.g., the level can be higher when more scan signals overlap and lower when fewer scan signals overlap). The third DC voltage Vcom3 is a voltage to be applied when transition distortion occurs due to the discontinuous operation of the gate driving circuit 120 in a transition period in which the display driving period DP is changed with the touch driving period TP, and can have a higher level than the first DC voltage Vcom1. At this time, the level of the third DC voltage Vcom3 can be higher than the first DC voltage Vcom1 but lower than the second DC voltage Vcom2 (e.g., Vcom1<Vcom 3<Vcom2).

The fourth DC voltage Vcom4 is a voltage to be applied when both of the transition distortion and overlapping distortion occur together according to the scan signals SCAN overlapping with each other in the transition period in which the display driving period DP is changed with the touch driving period TP, and can have a higher level than the first DC voltage Vcom1. In this situation, since transition distortion and overlapping distortion are compensated together, the level of the fourth DC voltage Vcom4 can be higher than that of the second DC voltage Vcom2 and the third DC voltage Vcom3 (e.g., Vcom1<Vcom 3<Vcom2<Vcom4).

Therefore, the DC compensation voltage Vcom_comp generated from the DC compensation voltage generating circuit 176 can be dynamically varied by the first DC compensation clock ComA_CLK and the second DC compensation clock ComB_CLK applied to the multiplexer MUX depending on different situations that need different amounts of compensation.

FIG. 24 is a flowchart illustrating a touch driving method according to embodiments of the disclosure.

Referring to FIG. 24, a touch driving method according to embodiments of the disclosure can include a step S100 of determining overlapping distortion of DC voltage Vcom generated in an overlapping period, a step S200 of generating a first DC compensation clock ComA_CLK corresponding to the overlapping distortion by using a gate clock signal GCLK and a main clock signal MCLK, a step S300 of determining transition distortion of the DC voltage generated in a transition period, a step S400 of generating a second DC compensation clock ComB_CLK corresponding to the transition distortion, a step S500 of generating a plurality of DC voltages Vcom1, Vcom2, Vcom3, and Vcom4 corresponding to the overlapping distortion and the transition distortion by using the reference DC voltage Vcom_ref, a step S600 of generating a DC compensation voltage Vcom_comp by using the first DC compensation clock ComA_CLK and the second DC compensation clock ComB_CLK, and a step S700 of applying the DC compensation voltage Vcom_comp in the overlapping period or the transition period.

The step S100 of determining overlapping distortion of DC voltage Vcom generated in an overlapping period is a process of determining the overlapping distortion in which the DC voltage Vcom is distorted by overlapping scan signals SCAN that occur during the display driving period DP.

The step S200 of generating a first DC compensation clock ComA_CLK corresponding to the overlapping distortion by using a gate clock signal GCLK and a main clock signal MCLK is a process of generating the first DC compensation clock ComA_CLK by reflecting a rising time of the gate clock signal GCLK for determining the rising time of the scan signals SCAN and a falling time of the main clock signal MCLK for determining the falling time of the scan signals SCAN according to a period when image defects such as horizontal line defects appear from a time point which the number of overlapping scan signals SCAN is reduced or decreases (e.g., such as an example situation when the number of overlapping scan signals reduces from 4 to 3 to 2 to 1, and then to zero).

The step S300 of determining transition distortion of the DC voltage generated in a transition period is a process of determining the transition distortion in which the DC voltage Vcom is distorted in the transition period when the display driving period DP is changed to the touch driving period TP or when the touch driving period TP is changed to the display driving period DP.

The step S400 of generating a second DC compensation clock ComB_CLK corresponding to the transition distortion is a process of generating the second DC compensation clock ComB_CLK corresponding to the transition period. At this time, the second DC compensation clock ComB_CLK can be generated according to the rising time of the gate clock signal GCLK for determining the rising time of the scan signals SCAN and the falling time of the main clock signal MCLK for determining the falling time of the scan signals SCAN.

The step S500 of generating a plurality of DC voltages Vcom1, Vcom2, Vcom3, and Vcom4 corresponding to the overlapping distortion and the transition distortion by using the reference DC voltage Vcom_ref is a process of generating a second DC voltage Vcom2 corresponding to the overlapping distortion, a third DC voltage Vcom3 corresponding to the transition distortion, and a fourth DC voltage Vcom4 corresponding to a situation in which the overlapping distortion and the transition distortion overlap is duplicated by using the reference DC voltage Vcom_ref in the DC voltage generating circuit 174.

The step S600 of generating a DC compensation voltage Vcom_comp by using the first DC compensation clock ComA_CLK and the second DC compensation clock ComB_CLK is a process of generating a DC compensation voltage Vcom_comp for compensating a distortion of the DC voltage induced at the display panel 110. For example, the first DC compensation clock ComA_CLK and the second DC compensation clock ComB_CLK can be used a selection signals input to a multiplexer.

The step S700 of applying the DC compensation voltage Vcom_comp in the overlapping period or the transition period is a process of compensating for the distortion of the DC voltage by applying the DC compensation voltage Vcom_comp to a period where the overlapping distortion and/or transition distortion occurs.

As described above, the touch display device 100 of the present disclosure has the effect of effectively compensating for a distortion of a DC voltage Vcom and improving image quality by applying a DC compensation voltage Vcom_comp with different levels to each distortion period for an overlapping period in which distortion of the DC voltage Vcom occurs due to the load deviation of the touch electrodes TE and overlapping the scan signals SCAN, and a transition period in which distortion of the DC voltage Vcom occurs during the transition process when the device switches between the display drive period DT and the touch drive period TP.

The foregoing embodiments are briefly described below.

According to embodiments of the disclosure, a touch display device can comprise a display panel including a plurality of touch electrodes, a gate driving circuit configured to apply a plurality of scan signals to the display panel through a plurality of gate lines, a touch driving circuit configured to detect touch according to a change in capacitance of the plurality of touch electrodes, a compensation clock generating circuit configured to generate DC compensation clocks for determining a DC compensation period by using clock signals that determines rising time and falling time of the plurality of scan signals, a DC voltage generating circuit configured to generate a plurality of DC voltages by using a reference DC voltage, and a DC compensation voltage generating circuit configured to generate a DC compensation voltage composed of the plurality of DC voltages by using the DC compensation clock.

The plurality of touch electrodes can be split-type touch electrodes split in a same shape.

The plurality of touch electrodes can be woven-type touch electrodes including long touch electrodes and short touch electrodes, the long touch electrodes being longer in a first direction than the short touch electrodes, the long touch electrodes and the short touch electrodes being alternately arranged in a second direction, and a plurality of the short touch electrodes arranged in the second direction being connected by one touch line.

The clock signals can include a gate clock signal whose rising time corresponds to rising times of the plurality of scan signals, and a main clock signal whose falling time corresponds to falling times of the plurality of scan signals.

The compensation clock generating circuit can include an edge detecting circuit for generating a gate clock trigger signal by detecting rising edges of the gate clock signal, and for generating a main clock trigger signal by detecting falling edges of the main clock signal.

The DC compensation clocks can include a first DC compensation clock generated by using the gate clock trigger signal and the main clock trigger signal to compensate for overlapping distortion caused by overlap of the plurality of scan signals during a display driving period, and a second DC compensation clock for compensating for transition distortion between the display driving period and touch driving period.

The second DC compensation clock can be generated by using the gate clock trigger signal and the main clock trigger signal.

The plurality of DC voltages can include a first DC voltage corresponding to the reference DC voltage, a second DC voltage for compensating for overlapping distortion caused by overlap of the plurality of scan signals during a display driving period, a third DC voltage for compensating for transition distortion due to switching between the display driving period and touch driving period, and a fourth DC voltage for compensating both of the overlapping distortion and the transition distortion occurring at a same time.

The DC voltage generating circuit can include a first amplifier configured to receive the reference DC voltage through a non-inverting input terminal and generate the second DC voltage by a plurality of resistors connected to an inverting input terminal, a second amplifier configured to receive the reference DC voltage through a non-inverting input terminal and generate a third DC voltage by a plurality of resistors connected to an inverting input terminal, and a third amplifier configured to receive the reference DC voltage through a non-inverting input terminal and generates a fourth DC voltage by a plurality of resistors connected to an inverting input terminal.

The second DC voltage can be determined by reflecting the number of overlapping scan signals (e.g., the level of the second DC voltage can bet set based on how many scan signals overlap with each other).

The third DC voltage can have a level greater than the reference DC voltage.

The second DC voltage can have a level greater than the third DC voltage.

The fourth DC voltage can have a level greater than the second DC voltage.

The DC compensation voltage generating circuit can include a multiplexer configured to receive the first DC voltage, the second DC voltage, the third DC voltage, and the fourth DC voltage as inputs and select an output signal according to the DC compensation clock.

The reference DC voltage can include a first reference DC voltage level when an operating temperature of the display panel is in a first temperature range, and a second reference DC voltage level different than the first reference DC voltage level when the operating temperature of the display panel is in a second temperature range different from the first temperature range.

According to embodiments of the disclosure, a touch driving method of a touch display device including a gate driving circuit supplying a plurality of scan signals to a display panel including a plurality of touch electrodes and a touch driving circuit applying touch driving signals to the display panel and sensing a touch based on touch sensing signals received in response to the touch driving signals, the touch driving method can comprise determining overlapping distortion of DC voltage generated in an overlapping period, generating a first DC compensation clock corresponding to the overlapping distortion by using a gate clock signal and a main clock signal, determining transition distortion of the DC voltage generated in a transition period, generating a second DC compensation clock corresponding to the transition distortion, generating a DC compensation voltage by using the first DC compensation clock and the second DC compensation clock, and applying the DC compensation voltage in the overlapping period or the transition period.

The touch driving method can further comprise generating a gate clock trigger signal by detecting rising edges of the gate clock signal, and generating a main clock trigger signal by detecting falling edges of the main clock signal.

The first DC compensation clock can be generated by using the gate clock trigger signal and the main clock trigger signal in order to compensate for overlapping distortion caused by overlap of the plurality of scan signals during a display driving period, and the second DC compensation clock can be generated to compensate for transition distortion between the display driving period and touch driving period.

The touch driving method can further comprise generating a plurality of DC voltages corresponding to overlapping distortion and transition distortion by using a reference DC voltage.

The plurality of DC voltages can include a first DC voltage corresponding to the reference DC voltage, a second DC voltage for compensating for overlapping distortion caused by overlap of the plurality of scan signals during a display driving period, a third DC voltage for compensating for transition distortion between the display driving period and touch driving period, and a fourth DC voltage for compensating both the overlapping distortion and the transition distortion.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the disclosure. The above description and the accompanying drawings provide an example of the technical idea of the disclosure for illustrative purposes only. For example, the disclosed embodiments are intended to illustrate the scope of the technical idea of the disclosure. Thus, the scope of the disclosure is not limited to the embodiments shown, but is to be accorded the widest scope consistent with the claims.

What is claimed is:

1. A touch display device comprising:
   a display panel including a plurality of touch electrodes;
   a gate driving circuit configured to apply a plurality of scan signals to the display panel through a plurality of gate lines;
   a touch driving circuit configured to detect a touch based on a change in a capacitance of the plurality of touch electrodes;
   a compensation clock generating circuit configured to generate direct current (DC) compensation clocks for determining a DC compensation period based on clock signals that determine rising times and falling times of the plurality of scan signals;
   a DC voltage generating circuit configured to generate a plurality of DC voltages based on a reference DC voltage; and
   a DC compensation voltage generating circuit configured to generate a DC compensation voltage based on one of the plurality of DC voltages and supply the DC compensation voltage to the display panel during the DC compensation period,
   wherein the DC compensation voltage is applied to the display panel during the DC compensation period that is a portion of a display driving period of the display panel, and
   wherein the DC compensation period is shorter than the display driving period.

2. The touch display device of claim 1, wherein the plurality of touch electrodes are split-type touch electrodes split in a same shape.

3. The touch display device of claim 1, wherein the plurality of touch electrodes are woven-type touch electrodes including long touch electrodes and short touch electrodes, the long touch electrodes being longer in a first direction than the short touch electrodes,
   wherein the long touch electrodes and the short touch electrodes are alternately arranged in a second direction, and
   wherein a plurality of the short touch electrodes arranged in the second direction are connected by one touch line.

4. The touch display device of claim 1, wherein the clock signals include:
   a gate clock signal having rising times that correspond to rising times of the plurality of scan signals; and
   a main clock signal having falling times that correspond to falling times of the plurality of scan signals.

5. The touch display device of claim 4, wherein the compensation clock generating circuit includes:
an edge detecting circuit configured to:
generate a gate clock trigger signal by detecting rising edges of the gate clock signal, and
generate a main clock trigger signal by detecting falling edges of the main clock signal.

6. The touch display device of claim 5, wherein the DC compensation clocks include:
a first DC compensation clock generated based on the gate clock trigger signal and the main clock trigger signal for determining when to compensate for overlapping distortion caused by at least some of the plurality of scan signals overlapping with each other during a display driving period; and
a second DC compensation clock for determining when to compensate for transition distortion caused by transitioning from the display driving period to a touch driving period or by transitioning from the touch driving period to the display driving period.

7. The touch display device of claim 6, wherein the second DC compensation clock is generated based on the gate clock trigger signal and the main clock trigger signal.

8. The touch display device of claim 1, wherein the plurality of DC voltages include:
a first DC voltage corresponding to the reference DC voltage;
a second DC voltage for compensating for overlapping distortion caused by at least some of the plurality of scan signals overlapping with each other during a display driving period;
a third DC voltage for compensating for transition distortion caused by transitioning from the display driving period to a touch driving period or by transitioning from the touch driving period to the display driving period; and
a fourth DC voltage for compensating for both of the overlapping distortion and the transition distortion.

9. The touch display device of claim 8, wherein the DC voltage generating circuit includes:
a first amplifier configured to receive the reference DC voltage through a non-inverting input terminal of the first amplifier and generate the second DC voltage based on a first plurality of resistors connected to an inverting input terminal of the first amplifier;
a second amplifier configured to receive the reference DC voltage through a non-inverting input terminal of the second amplifier and generate a third DC voltage based on a plurality of resistors connected to an inverting input terminal of the second amplifier; and
a third amplifier configured to receive the reference DC voltage through a non-inverting input terminal of the third amplifier and generate a fourth DC voltage based on a plurality of resistors connected to an inverting input terminal of the third amplifier.

10. The touch display device of claim 8, wherein the second DC voltage is determined based on a number of the plurality of scan signals that overlap with each other during the display driving period.

11. The touch display device of claim 8, wherein the third DC voltage is greater than the reference DC voltage.

12. The touch display device of claim 8, wherein the second DC voltage is greater than the third DC voltage.

13. The touch display device of claim 8, wherein the fourth DC voltage is greater than the second DC voltage.

14. The touch display device of claim 8, wherein the DC compensation voltage generating circuit includes:
a multiplexer configured to receive the first DC voltage, the second DC voltage, the third DC voltage, and the fourth DC voltage as inputs, and
select one of the inputs to provide as an output signal based on the DC compensation clocks.

15. The touch display device of claim 8, wherein the reference DC voltage is set to a first reference DC voltage level when an operating temperature of the display panel is within a first temperature range, and
wherein the reference DC voltage is set to a second reference DC voltage level when the operating temperature of the display panel is within a second temperature range different from the first temperature range, the second reference DC voltage level being different than the first reference DC voltage level.

16. A method of controlling a touch display device, the method comprising:
supplying, via a gate driving circuit, a plurality of scan signals to a display panel including a plurality of touch electrodes;
supplying, via a touch driving circuit, touch driving signals to the display panel;
sensing a touch based on touch sensing signals received in response to the touch driving signals;
generating a first direct current (DC) compensation clock based on a gate clock signal and a main clock signal for compensating for an overlapping distortion of a DC voltage in the display panel;
generating a second DC compensation clock for compensating for a transition distortion of the DC voltage; and
supplying a DC compensation voltage to the display panel based on the first DC compensation clock or the second DC compensation clock,
wherein the DC compensation voltage is applied to the display panel during a DC compensation period that is a portion of a display driving period of the display panel, and
wherein the DC compensation period is shorter than the display driving period.

17. The method of claim 16, further comprising:
generating a gate clock trigger signal based on detecting rising edges of the gate clock signal; and
generating a main clock trigger signal based on detecting falling edges of the main clock signal.

18. The method of claim 17, wherein the first DC compensation clock is generated for determining when to compensate for the overlapping distortion caused by at least some of the plurality of scan signals supplied to the display panel in the touch display device overlapping with each other during a display driving period, and
wherein the second DC compensation clock is generated for determining when to compensate for the transition distortion caused by transitioning from the display driving period to a touch driving period or by transitioning from the touch driving period to the display driving period.

19. The method of claim 16, further comprising:
generating a plurality of DC voltages based on a reference DC voltage.

20. The method of claim 19, wherein the plurality of DC voltages include:
a first DC voltage corresponding to the reference DC voltage;
a second DC voltage for compensating for overlapping distortion caused by at least some of the plurality of scan signals overlapping with each other during a display driving period;

a third DC voltage for compensating for transition distortion caused by transitioning from the display driving period to a touch driving period or by transitioning from the touch driving period to the display driving period; and
a fourth DC voltage for compensating for both of the overlapping distortion and the transition distortion.

* * * * *